United States Patent
Vaisman et al.

(10) Patent No.: US 11,781,817 B2
(45) Date of Patent: *Oct. 10, 2023

(54) THERMAL MANAGEMENT SYSTEMS FOR EXTENDED OPERATION

(71) Applicant: Booz Allen Hamilton Inc., McLean, VA (US)

(72) Inventors: Igor Vaisman, Carmel, IN (US); Joshua Peters, Knoxville, TN (US)

(73) Assignee: Booz Allen Hamilton Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,886

(22) Filed: Jun. 22, 2022

(65) Prior Publication Data
US 2022/0404105 A1    Dec. 22, 2022

Related U.S. Application Data

(60) Provisional application No. 63/213,329, filed on Jun. 22, 2021.

(51) Int. Cl.
*F28D 20/02*    (2006.01)
*F25B 5/04*    (2006.01)
(Continued)

(52) U.S. Cl.
CPC .............. *F28D 20/021* (2013.01); *F25B 5/04* (2013.01); *F25B 9/008* (2013.01); *F25B 19/005* (2013.01);
(Continued)

(58) Field of Classification Search
CPC .......... F25B 5/04; F25B 9/008; F25B 19/005; F25B 39/00; F25B 41/31; F25B 43/043;
(Continued)

(56) References Cited

U.S. PATENT DOCUMENTS 6,059,016 A  *  5/2000  Rafalovich ............. F28D 20/02
                                                          165/41
10,578,369 B1    3/2020  Johnson et al.
(Continued)

FOREIGN PATENT DOCUMENTS

CN    102798214 B  *  4/2015
CN    208423062 U  *  1/2019
(Continued)

OTHER PUBLICATIONS

International Search Report and Written Opinion in International Appln. No. PCT/US2022/034595, dated Oct. 12, 2022, 14 pages.
(Continued)

*Primary Examiner* — Kun Kai Ma
(74) *Attorney, Agent, or Firm* — Fish & Richardson P.C.

(57) ABSTRACT

A thermal management system includes a closed-circuit refrigeration system that includes a vapor cycle system (VCS) and a liquid pumping system (LPS). The VCS includes a receiver that stores a refrigerant fluid and a liquid separator. The vapor cycle system is configured to operate in one or more operational modes including at least one of a TES cooling mode, a heat load cooling mode, or a pump-down mode. The LPS includes a thermal energy storage (TES) that stores a phase change material (PCM) and a pump fluidly coupled to at least one evaporator. The evaporator is configured to extract heat from a heat load that is in thermal conductive or convective contact to the evaporator to transfer heat to the refrigerant fluid and provide the refrigerant fluid from an evaporator outlet to the TES.

54 Claims, 7 Drawing Sheets

(51) Int. Cl.
  *F25B 41/31* (2021.01)
  *F25B 9/00* (2006.01)
  *F25B 19/00* (2006.01)
  *F25B 39/00* (2006.01)
  *F25B 43/04* (2006.01)
(52) U.S. Cl.
  CPC .............. *F25B 39/00* (2013.01); *F25B 41/31* (2021.01); *F25B 43/043* (2013.01); *F25B 2309/061* (2013.01); *F25B 2400/16* (2013.01); *F25B 2400/19* (2013.01); *F25B 2400/23* (2013.01); *F25B 2400/24* (2013.01)
(58) Field of Classification Search
  CPC ............ F25B 2309/061; F25B 2400/16; F25B 2400/19; F25B 2400/23; F25B 2400/24; F25B 41/24; F25B 41/20; F25B 5/02; F25B 40/00; F28D 20/021; Y02E 60/14
  See application file for complete search history.

(56) References Cited

U.S. PATENT DOCUMENTS

| | | | |
|---|---|---|---|
| 10,746,440 | B2 | 8/2020 | Donovan et al. |
| 11,644,251 | B2 | 5/2023 | Vaisman et al. |
| 2003/0159455 | A1 | 8/2003 | Aikawa et al. |
| 2004/0216483 | A1 | 11/2004 | Inaba et al. |
| 2007/0095093 | A1 | 5/2007 | Narayanamurthy |
| 2008/0034760 | A1* | 2/2008 | Narayanamurthy .. F24F 5/0017 62/434 |
| 2009/0133412 | A1 | 5/2009 | Narayanamurthy et al. |
| 2009/0293507 | A1 | 12/2009 | Narayanamurthy et al. |
| 2009/0314023 | A1 | 12/2009 | Labaste et al. |
| 2011/0011119 | A1 | 1/2011 | Kuehl et al. |
| 2011/0048058 | A1 | 3/2011 | Narayanamurthy et al. |
| 2011/0162829 | A1* | 7/2011 | Xiang ..................... F28C 3/005 165/234 |
| 2013/0111934 | A1 | 5/2013 | Wang et al. |
| 2015/0191254 | A1 | 7/2015 | Vaisman |
| 2019/0264933 | A1 | 8/2019 | Ignatiev et al. |
| 2019/0316817 | A1 | 10/2019 | Donovan et al. |
| 2019/0316850 | A1* | 10/2019 | Snyder .................. F28D 15/025 |
| 2023/0003423 | A1 | 1/2023 | Vaisman et al. |

FOREIGN PATENT DOCUMENTS

| | | | |
|---|---|---|---|
| CN | 111365755 A | * | 7/2020 |
| EP | 3239624 | | 11/2017 |
| EP | 3995758 | | 5/2022 |
| JP | H06257868 | | 9/1994 |
| WO | WO-9719304 A1 | * | 5/1997 ............ F24F 5/0017 |
| WO | WO 2022271869 | | 12/2022 |

OTHER PUBLICATIONS

International Search Report and Written Opinion in International Appln. No. PCT/US2022/034591, dated Sep. 28, 2022, 9 pages.

U.S. Appl. No. 17/846,916, filed Jun. 22, 2022, Vaisman et al.

* cited by examiner

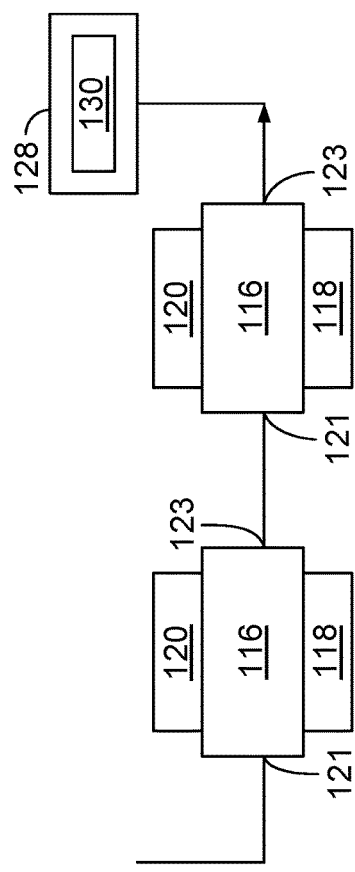
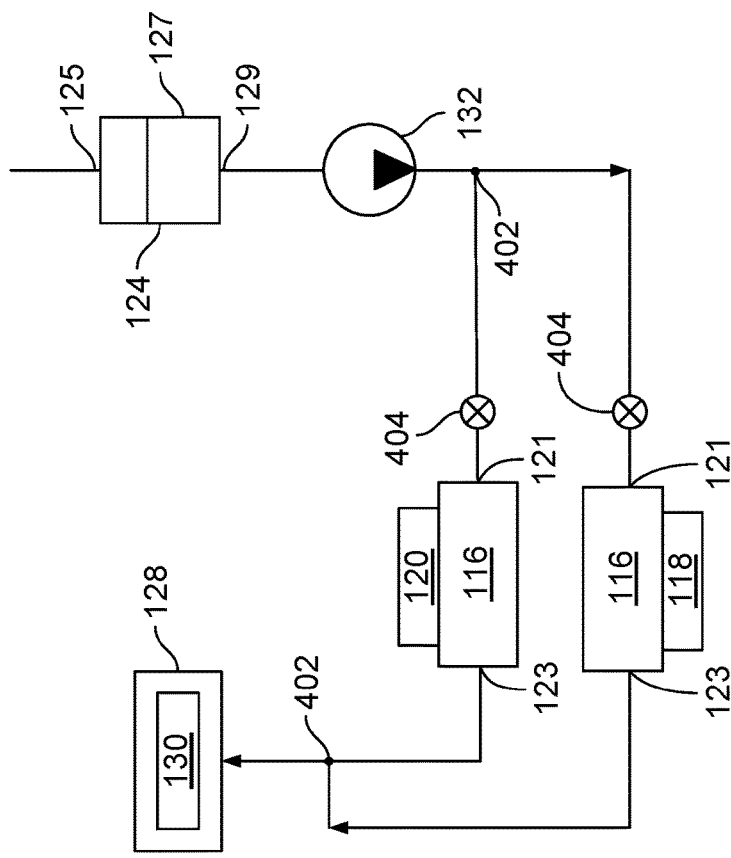
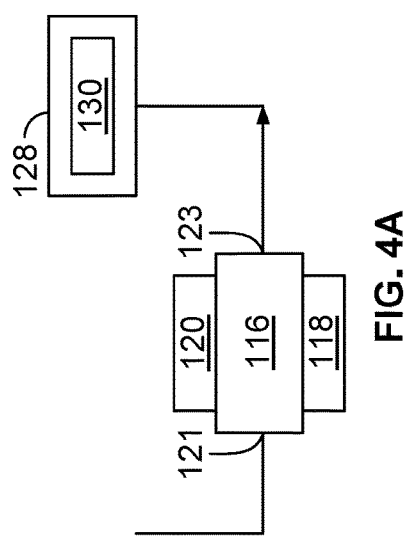
FIG. 4A
FIG. 4B
FIG. 4C
FIG. 4D

THERMAL MANAGEMENT SYSTEMS FOR EXTENDED OPERATION

CLAIM OF PRIORITY

This application claims priority under 35 U.S.C. § 119(e) to U.S. Provisional Patent Application Ser. No. 63/213,329, filed on Jun. 22, 2021, and entitled "THERMAL MANAGEMENT SYSTEMS FOR EXTENDED OPERATION," the entire contents of which are hereby incorporated by reference.

BACKGROUND

Refrigeration systems absorb thermal energy from heat sources operating at temperatures below the temperature of the surrounding environment and discharge thermal energy into the surrounding environment. Heat sources operating at temperatures above the surrounding environment can be naturally cooled by the surrounding if there is direct contact between the source and the environment.

Conventional refrigeration systems include a compressor, a heat rejection heat exchanger (i.e., a condenser), a receiver, an expansion device, and a heat absorption exchanger (i.e., an evaporator). Such systems can be used to maintain operating temperature set points for a wide variety of cooled heat sources (loads, processes, equipment, systems) thermally interacting with the evaporator. Closed-circuit refrigeration systems may pump significant amounts of absorbed thermal energy from heat sources into the surrounding environment.

In closed-circuit systems, compressors are used to compress vapor from an evaporating pressure the evaporator and to a condensing pressure in the condensers and condense the compressed vapor converting the vapor into a liquid at a temperature higher than the surrounding environment temperature. The combination of condensers and compressors can add a significant amount of weight and can consume relatively large amounts of electrical power. In general, the larger the amount of absorbed thermal energy that the system is designed to handle, the heavier the refrigeration system and the larger the amount of power consumed during operation, even when cooling of a heat source occurs over relatively short time periods.

SUMMARY

This disclosure features a thermal management system (TMS) that, in some implementations, enables direct cooling of a phase change material (PCM) in a thermal energy storage (TES), as well as one or more devices being cooled by the TES. The TMS can include a closed-circuit refrigeration system (CCRS), as well as a closed-circuit refrigeration system (CCRS) integrated with an open circuit refrigeration system (OCRS).

In an example implementation, a thermal management system includes a closed-circuit refrigeration system that includes a vapor cycle system (VCS) and a liquid pumping system (LPS). The VCS includes a receiver that stores a refrigerant fluid; and a liquid separator having a liquid-separator inlet, a liquid-side outlet, and a vapor side outlet, the vapor cycle system configured to operate in one or more operational modes including at least one of a TES cooling mode, a heat load cooling mode, or a pump-down mode. The LPS includes a thermal energy storage (TES) that stores a phase change material (PCM), with the TES having a TES inlet and a TES outlet fluidly coupled to the liquid separator inlet; a pump having a pump inlet and a pump outlet; and at least one evaporator having an evaporator inlet coupled to the pump outlet. The evaporator is configured to extract heat from a heat load that is in thermal conductive or convective contact or in proximity to the evaporator to transfer heat from the heat load to the refrigerant fluid and provide the refrigerant fluid from an evaporator outlet to the TES inlet, the LPS configured to operate in the heat load cooling mode.

In an aspect combinable with the example implementation, the VCS further includes an expansion valve, a compressor, and a heat rejection heat exchanger.

In another aspect combinable with any of the previous aspects, the expansion valve is configured to control a vapor quality of the refrigerant fluid at the evaporator outlet.

In another aspect combinable with any of the previous aspects, the TES includes is a heat exchanger that provides thermal contact between the PCM and the refrigerant fluid.

In another aspect combinable with any of the previous aspects, in the TES cooling mode, the VCS is configured to charge the PCM in the TES by directing the refrigerant fluid from the receiver though the liquid separator and through the pump and the evaporator to the TES to cause cooling energy from the refrigerant fluid to be stored in the PCM in latent heat form.

In another aspect combinable with any of the previous aspects, the VCS operates according to a transcritical refrigeration cycle or a subcritical refrigeration cycle.

In another aspect combinable with any of the previous aspects, the VCS is configured to operate in the transcritical refrigeration cycle, and the heat rejection heat exchanger operates as a gas cooler, and the compressor induces refrigerant vapor from the vapor side outlet of the liquid separator at a low pressure and compresses the refrigerant vapor at the low pressure into a refrigerant vapor at a high pressure, with the refrigerant vapor at the high pressure and temperature being cooled in the gas cooler.

In another aspect combinable with any of the previous aspects, the VCS is configured to operate in the subcritical refrigeration cycle, and the heat rejection heat exchanger operates as a condenser, with the refrigerant vapor in the condenser being de-superheated, condensed, and subcooled.

In another aspect combinable with any of the previous aspects, in the heat load cooling mode, the VCS is configured to cool the heat load.

In another aspect combinable with any of the previous aspects, liquid refrigerant from the receiver is iso-enthalpically expanded in the expansion valve to a low-pressure two-phase mixture of a refrigerant liquid phase and a refrigerant vapor phase.

In another aspect combinable with any of the previous aspects, a portion of the refrigerant liquid phase boils out to cool or freeze the PCM in the TES, with any non-evaporated refrigerant liquid being captured by the liquid separator.

In another aspect combinable with any of the previous aspects, the LPS is configured to cool the heat load by discharging the stored cooling energy from the PCM in the heal load cooling mode based on operation of the heat load.

In another aspect combinable with any of the previous aspects, the LPS is configured to evaporate the refrigerant fluid at a temperature in a range that is below the heat load temperature low limit in order to satisfy heat load temperature tolerances and at the heat transfer rate generated by a temperature differential, and above a PCM freezing temperature to enable operation of the TES as a condenser.

In another aspect combinable with any of the previous aspects, the heat load cooling mode starts either while the compressor is in an off state or while the compressor is in an on state.

In another aspect combinable with any of the previous aspects, when the compressor is in the off state, the VCS is configured to operate to increase a refrigerant pressure of the refrigerant fluid to turn the refrigerant fluid that is in a saturated refrigerant liquid thermodynamic state in the liquid separator into a subcooled state.

In another aspect combinable with any of the previous aspects, the pump is configured to circulate the subcooled refrigerant liquid from the liquid-side outlet through the evaporator to cause complete or partial evaporation of the refrigerant liquid, with refrigerant vapor formed in the evaporator being transported to the TES for cooling.

In another aspect combinable with any of the previous aspects, when the PCM has melted and the stored thermal energy is depleted, the heat load cooling mode has completed a cycle of operation.

In another aspect combinable with any of the previous aspects, when the compressor is in the on state, the compressor operation increases system cooling capacity or extends the cooling period.

In another aspect combinable with any of the previous aspects, when refrigerant is pumped into the evaporator, the heat load generates refrigerant vapor and an evaporating pressure in the evaporator rises, increasing the pressure in the liquid separator, and a refrigerant liquid thermodynamic state becomes subcooled, and with the engaged pump pumping the subcooled refrigerant liquid from a liquid-side outlet of the liquid separator through the evaporator causing complete or partial evaporation of the subcooled refrigerant liquid, with the refrigerant vapor that results from operation of the heat load in contact with or proximate to the evaporator is condensed and subcooled in the TES.

In another aspect combinable with any of the previous aspects, the VCS is configured to return the subcooled refrigerant liquid from the receiver to the liquid separator inlet.

Another aspect combinable with any of the previous aspects further includes a back-pressure regulator; and wherein in the pump-down mode the heat load is off and the pump is off, the—pressure regulator is closed and the compressor is on.

In another aspect combinable with any of the previous aspects, in the pump-down mode, the compressor is configured to receive refrigerant vapor from the liquid separator, compresses the refrigerant vapor, and cause the compressed refrigerant vapor to be condensed in the heat rejection heat exchanger, and with the heat rejection exchanger returning the condensed refrigerant vapor to the receiver.

In another aspect combinable with any of the previous aspects, during compressor operation, the pressure in the liquid separator is reduced, the evaporating temperature is reduced, and refrigerant fluid evaporates generating refrigerant vapor for the compressor to compress.

Another aspect combinable with any of the previous aspects further includes an open-circuit refrigerant system including the receiver, the expansion valve, the TES, the evaporator, the liquid separator.

In another aspect combinable with any of the previous aspects, the open-circuit refrigerant system further includes an exhaust; and a back-pressure regulator configurable to control a temperature of the heat load.

In another aspect combinable with any of the previous aspects, the expansion valve is configured to control a vapor quality of the refrigerant fluid at the evaporator, while avoiding a dryout region of a phase state of the refrigerant fluid.

Another aspect combinable with any of the previous aspects further includes a recuperative heat exchanger having a pair of refrigerant fluid paths, with a first refrigerant fluid path coupled downstream of the receiver and a second refrigerant fluid path coupled upstream of the liquid separator.

In another aspect combinable with any of the previous aspects, the recuperative heat exchanger provides thermal contact between a liquid refrigerant leaving the receiver and a refrigerant vapor from the liquid separator.

Another aspect combinable with any of the previous aspects further includes a recuperative heat exchanger having a pair of refrigerant fluid paths, with a first refrigerant fluid path coupled downstream of the receiver and a second refrigerant fluid path coupled upstream of the liquid separator.

In another aspect combinable with any of the previous aspects, the recuperative heat exchanger provides thermal contact between a liquid refrigerant leaving the receiver and a refrigerant vapor from the liquid separator.

In another aspect combinable with any of the previous aspects, the evaporator inlet is fluidly coupled to the pump outlet and he evaporator outlet is fluidly coupled to the TES inlet, and the TES outlet is fluidly coupled to liquid separator inlet.

In another aspect combinable with any of the previous aspects, the evaporator has an evaporator inlet coupled to the TES outlet and has the evaporator outlet coupled to the liquid separator inlet, and the TES has the TES inlet coupled to the pump outlet.

In another aspect combinable with any of the previous aspects, the evaporator is a first evaporator, and the system further includes a second evaporator.

In another aspect combinable with any of the previous aspects, the second evaporator has an inlet fluidly coupled to the receiver outlet and has an outlet fluidly coupled to the compressor inlet.

In another aspect combinable with any of the previous aspects, the second evaporator is configured to cool a high temperature heat load; and the system further includes an expansion valve fluidly coupled to the receiver outlet and the inlet to the second evaporator.

In another example implementation, a thermal management method includes transporting a refrigerant fluid along a closed-circuit refrigerant fluid flow path that extends from a receiver to a thermal energy system (TES) of a vapor cycle system (VCS) that stores a phase change material (PCM) to a liquid separator. A liquid-side of the liquid separator is fluidly coupled to a pump inlet of a pump of a liquid pumping system (LPS) and a pump outlet of the pump is fluidly coupled to an evaporator. A vapor-side of the liquid separator is fluidly coupled to a compressor and a heat rejection heat exchanger is fluidly coupled to the compressor, with the compressor having an outlet coupled to a receiver inlet. The method further includes operating the closed-circuit refrigerant fluid flow path according to an operational mode that includes at least one of a TES cooling mode, a heat load cooling mode, or a pump-down mode.

An aspect combinable with the example implementation further includes transporting the refrigerant fluid from the receiver to an expansion valve.

Another aspect combinable with any of the previous aspects further includes controlling a vapor quality of the refrigerant fluid at an outlet of the evaporator with the expansion valve.

Another aspect combinable with any of the previous aspects further includes providing heat exchange between the PCM and the refrigerant fluid in the TES.

Another aspect combinable with any of the previous aspects further includes operating the closed-circuit refrigeration system in the TES cooling mode.

Another aspect combinable with any of the previous aspects further includes charging the PCM in the TES by directing the refrigerant fluid though the TES from the receiver; and causing cooling energy from the refrigerant fluid to be stored in the PCM in latent heat form.

Another aspect combinable with any of the previous aspects further includes operating the VCS in a transcritical refrigeration cycle or a subcritical refrigeration cycle.

In another aspect combinable with any of the previous aspects, operating the VCS in the transcritical refrigeration cycle includes causing the heat rejection heat exchanger to operate as a gas cooler; compressing, by the compressor, a refrigerant vapor from a vapor side outlet of the liquid separator that is induced at a low pressure to compress the refrigerant vapor at the low pressure into a refrigerant vapor at a high pressure and high temperature; and cooling the refrigerant vapor at the high pressure and high temperature in the gas cooler.

In another aspect combinable with any of the previous aspects, operating the VCS in the subcritical refrigeration cycle includes causing the heat rejection heat exchanger to operate as a condenser; and condensing a refrigerant vapor in the condenser by de-superheating, condensing, and subcooling.

Another aspect combinable with any of the previous aspects further includes cooling the heat load in the TES heat load cooling mode.

Another aspect combinable with any of the previous aspects further includes iso-enthalpically expanding liquid refrigerant from the receiver in the expansion valve to a low-pressure two-phase mixture of a refrigerant liquid phase and a refrigerant vapor phase.

Another aspect combinable with any of the previous aspects further includes boiling a portion of the refrigerant liquid phase out from the PCM in the TES; and capturing non-evaporated refrigerant liquid by the liquid separator.

Another aspect combinable with any of the previous aspects further includes operating the LPS to cool the heat load by discharging the stored cooling energy from the PCM.

Another aspect combinable with any of the previous aspects further includes evaporating refrigerant fluid, with operation of the LPS, at a temperature in a range that is below the heat load temperature low limit in order to satisfy heat load temperature tolerances and at the heat transfer rate generated by a temperature differential, and above a phase change material freezing temperature, to enable operation of the TES as a condenser.

Another aspect combinable with any of the previous aspects further includes initiating operation of the heat load cooling mode either while the compressor is in an off state or while the compressor is in an on state.

In another aspect combinable with any of the previous aspects, when the compressor is in the off state, the method further includes converting refrigerant pressure of the refrigerant fluid in the VCS that is in a saturated refrigerant liquid thermodynamic state in the liquid separator into a subcooled state; and pumping the subcooled refrigerant liquid through the evaporator to cause complete or partial evaporation of the refrigerant liquid, with refrigerant vapor formed in the evaporator being captured by and condensed and subcooled in the TES.

Another aspect combinable with any of the previous aspects further includes returning the subcooled refrigerant liquid to the liquid separator.

In another aspect combinable with any of the previous aspects, when the PCM has melted and the stored thermal energy is depleted, the heat load cooling mode has completed a cycle of operation.

Another aspect combinable with any of the previous aspects further includes increasing the overall system cooling capacity or extends the cooling period when the compressor is in the on state.

In another aspect combinable with any of the previous aspects, when refrigerant is pumped into the evaporator, the heat load generates refrigerant vapor and an evaporating pressure in the evaporator rises, increasing the pressure in the liquid separator, and a refrigerant liquid thermodynamic state becomes subcooled, and with the engaged pump pumping the subcooled refrigerant liquid from a liquid-side outlet of the liquid separator through the evaporator causing complete or partial evaporation of the subcooled refrigerant liquid, with the refrigerant vapor that results from operation of the heat load in contact with or proximate to the evaporator is condensed and subcooled in the TES.

Another aspect combinable with any of the previous aspects further includes discharging a portion of the refrigerant fluid through an open-circuit refrigerant system that includes the receiver, the expansion valve, the TES, the evaporator, the liquid separator, the open-circuit refrigeration system further including an exhaust line and a back-pressure regulator configured to control a temperature of the heat load.

Another aspect combinable with any of the previous aspects further includes directing the refrigerant through a recuperative heat exchanger having a pair of refrigerant fluid paths, with a first refrigerant fluid path fluidly coupled downstream of the receiver and a second refrigerant fluid path fluidly coupled upstream of the liquid separator.

In another aspect combinable with any of the previous aspects, the evaporator is a first evaporator, and the method further includes directing a portion of the refrigerant from the receiver to a second evaporator.

Another aspect combinable with any of the previous aspects further includes cooling a high temperature heat load in the second evaporator.

One or more of the above aspects may provide one or more of the following advantages and/or other advantages as disclosed herein.

The TES increases the cooling capacity of the TMS when a low heat load and/or a high heat load is activated, but without a duty cycle cooling penalty commonly encountered with TES systems, i.e., use of a secondary fluid to cool the phase change material. The cooling duty is executed without the concomitant penalty of conventional TES systems provided that the receiver has enough refrigerant.

The details of one or more embodiments are set forth in the accompanying drawings and the description below. Other features and advantages will be apparent from the description, drawings, and claims.

DESCRIPTION OF DRAWINGS

FIGS. 4A-4D are schematic diagrams that show alternative implementations of an evaporator configuration according to the present disclosure.

DETAILED DESCRIPTION

Figure 1:
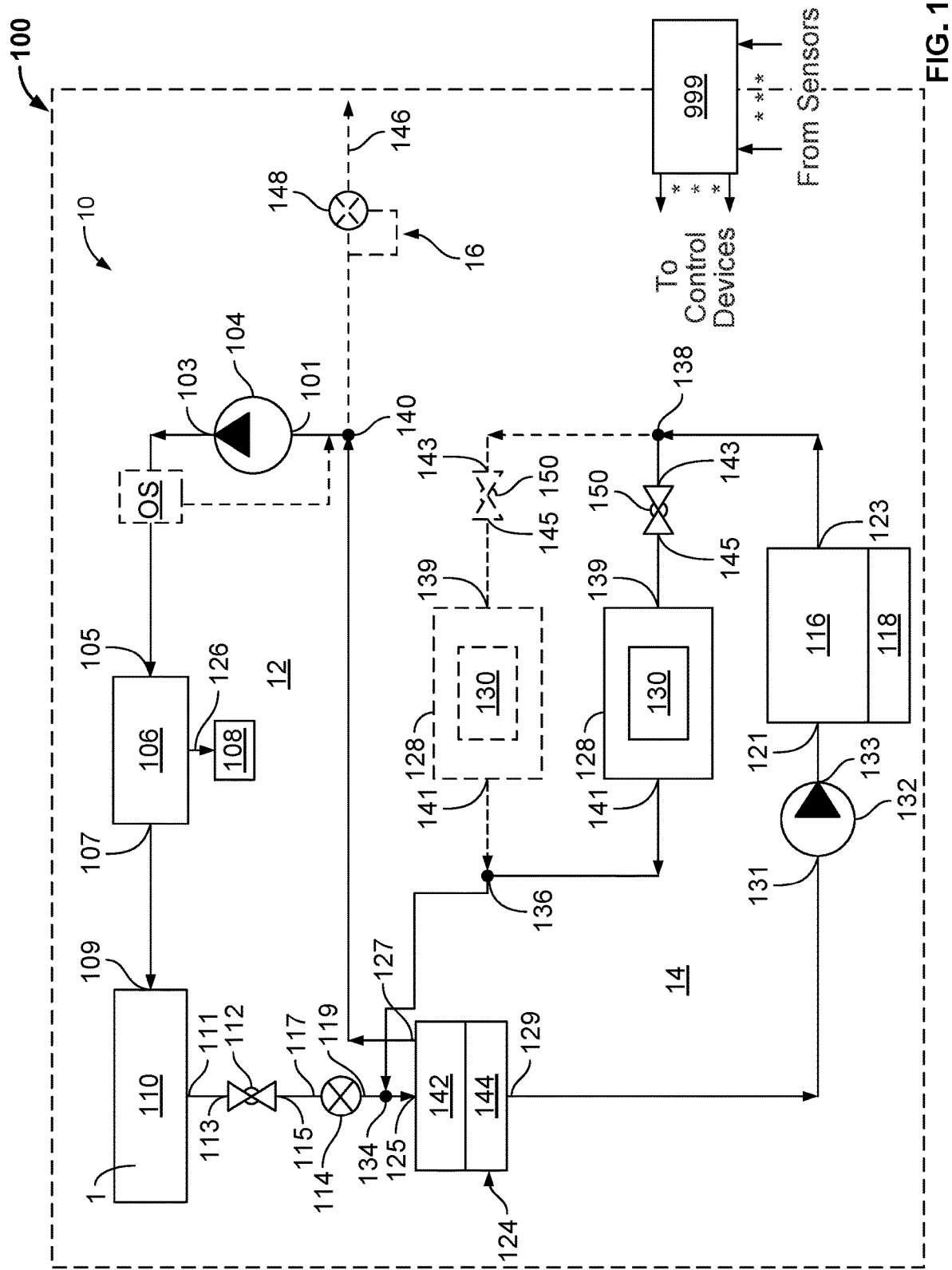
FIGS. 1-3 are schematic diagrams of example implementations of a thermal management system (TMS) that includes a thermal energy storage (TES) according to the present disclosure.

Cooling of high heat loads that are also highly temperature sensitive can present a number of challenges. On one hand, such loads generate significant quantities of heat that is extracted during cooling. In conventional closed-cycle refrigeration systems, cooling high heat loads typically involves circulating refrigerant fluid at a relatively high mass flow rate. However, closed-cycle system components that are used for refrigerant fluid circulation—including compressors and condensers—are typically heavy and consume significant power. As a result, many closed-cycle systems are not well suited for deployment in mobile platforms—such as on small vehicles—where size and weight constraints may make the use of large compressors and condensers impractical.

Temperature sensitive loads such as electronic components and devices may require temperature regulation within a relatively narrow range of operating temperatures. Maintaining the temperature of such a load to within a small tolerance of a temperature set point can be challenging when a single-phase refrigerant fluid is used for heat extraction, since the refrigerant fluid itself will increase in temperature as heat is absorbed from the load.

Directed energy systems that are mounted to mobile vehicles such as trucks or planes may present many of the foregoing operating challenges, as such systems may include high heat, temperature sensitive components that require precise cooling during operation in a relatively short time. The thermal management systems disclosed herein, while generally applicable to the cooling of a wide variety of thermal loads, are particularly well suited for operation with such directed energy systems.

In particular, the thermal management systems and methods disclosed herein include a number of features that reduce both overall size and weight relative to conventional refrigeration systems, and still extract excess heat energy from both high heat, highly temperature sensitive components and relatively temperature insensitive components, to accurately match temperature set points for the components. At the same time, the disclosed thermal management systems require no significant power to sustain their operation. Whereas certain conventional refrigeration systems used closed-circuit refrigerant flow paths, the systems and methods disclosed herein use intermittent cooling processes. Depending upon the nature of the refrigerant fluid, exhaust refrigerant fluid may be incinerated as fuel, chemically treated, and/or simply discharged at the end of the flow path.

In some aspects, "refrigeration" as used in the present disclosure can mean a system (or multiple systems fluidly coupled) that operates to generate a purposeful change of a characteristic of a coolant (e.g., a refrigerant fluid) to effectuate or increase heat transfer between two mediums (one of which can be the coolant). The purposeful change of the characteristic can be, for example, a change in pressure (e.g., depressurization) of a pressurized coolant though an expansion valve. In some embodiments, the change in pressure can include a phase change of the coolant, such as a liquid-to-gas phase change (e.g., endothermic vaporization). In some embodiments, pressurization of the refrigerant can be performed by a powered (e.g., electrically or otherwise) component, such as (but not limited to) a compressor. In some embodiments, pressurization can be performed as part of the refrigeration cycle (e.g., a closed-cycle refrigeration process in which gaseous refrigerant is substantially or completely recycled and compressed into a liquid state) or prior to use (e.g., storing pre-compressed liquid refrigerant for later use in an open-cycle refrigeration process in which a reserve of liquid refrigerant is used but substantially not recycled). In some embodiments, the phase change can be driven by heating a liquid refrigerant with a very low boiling point (e.g., ammonia as used in an absorption-type refrigeration cycle).

Referring now to FIG. 1, an example of a thermal management system (TMS) 100 is shown to include a vapor cycle system (VCS) 12 and a liquid pumping system (LPS) 14 that are arranged in a closed-circuit refrigeration system (CCRS) 10. The VCS 12 includes a receiver 110 having inlet 109 and an outlet 111, an optional solenoid valve 112 having an inlet 113 and outlet 115, a flow control device 114 (e.g., an expansion valve 114) having an inlet 117 and outlet 119, an evaporator 116 (with example configurations shown in FIGS. 4A-4D) having an inlet 121 and outlet 123, a thermal energy storage (TES) 128 having an inlet 139 and outlet 141, a liquid separator 124, a compressor 104 having an inlet 101 and outlet 103, and a condenser 106, coupled in a vapor compression path. The TES 128 contains a phase change material (PCM) 130, as shown in FIG. 1.

The LPS 14 includes a pump 132 having an inlet 131 and outlet 133, the evaporator 116, the TES 128, and the liquid separator 124 coupled in a liquid pumping path. The liquid separator 124 includes an inlet 125, a vapor-side outlet 127, and a liquid-side outlet 129, as well as a vapor section 142 and a liquid section 144. A thermal load, i.e., a heat load 118 (e.g., a relatively low heat load over relatively long-time intervals or a relatively high heat load over relatively short-time intervals) is in thermal conductive and/or convective contact or in proximity to evaporator 116. The portions of the LPS 14 and VCS 12 are coupled, via conduit and a junction 134, as shown.

Shown in an optional arrangement in FIG. 1 is an open-cycle refrigeration system (OCRS) 16. Integration of OCRS 16 with the CCRS 10 can further extend the cooling capabilities of the TMS 100 after the stored cooling energy in the PCM 130 is depleted. Regarding OCRS 16, this optional circuit includes receiver 110, the solenoid valve 112, the expansion valve 114, the TES 128, the evaporator 116, the liquid separator 124, a junction 140, and an optional flow control device 148 positioned in exhaust 146. In some aspects, the optional flow control device 148 can be an optional back-pressure regulator 148 (e.g., to support an open-circuit refrigeration cycle mode). As further shown, in this example, the evaporator 116 is configured to cool heat load 118. During operation of the OCRS 16, the OCRS 16 discharges refrigerant vapor via the exhaust 146, with the discharged refrigerant vapor not being returned to the receiver 110 (e.g., directly). In some aspects, open-circuit configurations are not used with transcritical operation of VCS 12.

The back-pressure regulator 148 generally functions for, e.g. emergency control of an evaporating pressure when in OCRS operation. A back-pressure regulator (BPR) is a device that regulates fluid pressure upstream from the regulator. In general, a wide range of different electrical/electronic devices can be used as back-pressure regulator 148. Typical electrical back-pressure regulating devices include an orifice, a moving seat, a motor or actuator that changes the position of the seat in respect to the orifice, a control system 999, and a pressure sensor at the evaporator outlet or at the valve inlet. If the refrigerant fluid pressure is above a set-point value, the seat moves to increase the cross-sectional area of the orifice and the refrigerant fluid volume and mass flow rates to re-establish the set-point pressure value. If the refrigerant fluid pressure is below the set-point value, the seat moves to decrease the cross-sectional area and the refrigerant fluid flow rates. In general, back-pressure regulators are selected based on the refrigerant fluid volume flow rate, the pressure differential across the regulator, and the pressure and temperature at the regulator inlet. Examples of suitable commercially available back-pressure regulators that can function as the back-pressure regulator 306 include, but are not limited to, valves available from the Sporlan Division of Parker Hannifin Corporation (Washington, Mo.) and from Danfoss (Syddanmark, Denmark).

In addition, the CCRS 10 may include an oil separator OS. As shown, the OS is disposed in an oil return path (denoted by dashed line). Similar oil recovery arrangements can be provided for the other embodiments disclosed herein.

In some aspects, the pump 132 is located distal from the liquid-side outlet 129. This configuration potentially presents the possibility of cavitation. In another example, the pump 132 is located distal from the liquid-side outlet 129, but the inlet 125 has a sensor to sense when a column of liquid in the liquid separator 124 reaches a certain height. This configuration potentially minimizes the possibility of cavitation. To further minimize the possibility of cavitation, the pump 132 can be located close to the liquid-side outlet 129, and a height at which the inlet 125 is located is relatively high in the liquid separator 124. This would result in an increase in liquid pressure at the liquid-side outlet 129, and concomitant therewith an increase in liquid pressure at the inlet of the pump 132. Increasing the pressure at the inlet to the pump 132 should minimize any possibility of cavitation. Another strategy can be to locate the pump 132 proximate to or indeed inside of the liquid-side outlet 129. In addition, the height at which the inlet 125 is located can be relatively high as noted. This would result in an increase in liquid pressure at the inlet of the pump 132 further minimizing the possibility of cavitation. Any of the modifications described can use a sensor that produces a signal that is a measure of the height of a column of liquid in the liquid separator 124. The signal is sent to the control system 999 that will be used to start the pump 132 once a sufficient height of liquid is contained by the liquid separator 124.

The receiver 110 stores refrigerant fluid 1, e.g., a refrigerant liquid or mixed-phase fluid. Receiver 110 includes inlet 109, outlet 111, and, in some aspects, a pressure relief valve. To charge receiver 110, refrigerant fluid 1 is typically introduced into receiver 110 via inlet 109, and this can be done, for example, at service locations. Operating in the field, the refrigerant exits receiver 110 through outlet 111. In case of emergency, if the pressure within receiver 110 exceeds a pressure limit value, a pressure relief valve opens to allow a portion of the refrigerant fluid 1 to escape through the valve to reduce the pressure within receiver 110. Receiver 110 can also include insulation (not shown) applied around the receiver. In general, receiver 110 can have a variety of different shapes. In some embodiments, for example, the receiver 110 is cylindrical. Examples of other possible shapes include, but are not limited to, rectangular prismatic, cubic, and conical. In certain embodiments, receiver 110 can be oriented such that outlet 111 is positioned at the bottom of the receiver 110.

The expansion valve 114 functions as a flow control device in some aspects. In general, expansion valve 114 can be implemented as any one or more of a variety of different electronic devices. For example, in some embodiments, expansion valve 114 can be implemented as a fixed orifice, a capillary tube, and/or an electronic expansion valve. In general, fixed orifices and capillary tubes are passive flow restriction elements which do not actively regulate refrigerant fluid flow. In some aspects, the expansion valve 114 (e.g., as an electronic valve) does not control a superheat, but controls a compressor suction pressure.

Typical electrical expansion valves include an orifice, a moving seat, a motor or actuator that changes the position of the seat with respect to the orifice, a control system 999 (an example implementation shown in FIG. 6), and a pressure sensor at the evaporator outlet 123. If the pressure is below the set-point value, the seat moves to increase the cross-sectional area and the refrigerant fluid flow rates. If the pressure is above the set-point value, the seat moves to decrease the cross-sectional area and the refrigerant fluid flow rates. The control system 999 can follow this operation.

The condenser 106 can operate as a condenser in subcritical VCS operation and as a gas cooler in transcritical VCS operation (with the term "condenser" used herein for both types of heat rejection heat exchangers). A fan 108 (or pump 108) circulates an airflow 126 (or water flow 126 as appropriate) through the condenser 106 to cool the refrigerant fluid circulating in the condenser 106 between the inlet 105 and the outlet 107. In some aspects, subcritical refrigeration includes four specific processes: evaporation, compression, condensation, and expansion. Subcritical system refrigeration has all of these processes occurring below the refrigerant fluid critical temperature. On the other hand, in some aspects, transcritical refrigeration is a process in which the heat rejection portion of the refrigeration cycle occurs at pressures that are above the critical pressure of the refrigerant fluid 1 and other parts of the transcritical refrigeration cycle occur at pressures that are below the critical pressure.

Evaporator 116 can be implemented in a variety of ways. In general, evaporator 116 functions as a heat absorption exchanger, providing thermal contact between the refrigerant fluid 1 and heat loads 120, 118 (described later), or other heat loads. Typically, evaporator 116 includes one or more flow channels extending internally between an inlet and an outlet of the evaporator, allowing refrigerant fluid to flow through the evaporator 116 and absorb heat from heat loads in thermal contact with the evaporator 116. A variety of different evaporators can be used. In general, any cold plate may function as the evaporator 116 of the open circuit refrigeration systems disclosed herein as well. Evaporator 116 can accommodate any refrigerant fluid channels (including mini/micro-channel tubes), blocks of printed circuit heat exchanging structures, or more generally, any heat exchanging structures that are used to transport single-phase or two-phase fluids. The evaporator 116 and/or components thereof, such as fluid transport channels, can be attached to the heat load mechanically, or can be welded, brazed, or bonded to the heat load in any manner. In some implementations, evaporator 116 (or certain components thereof) can be fabricated as part of heat loads, such as high heat load 118 or low heat load 120 or otherwise integrated into such heat loads. When integrated, the portion of heat loads can include refrigerant fluid channel(s) together with, e.g., a the cold plate, to effectively function as the evaporator 116 for the TMS 100 (or other example TMS according to the present disclosure).

The TES 128, in this example, is a heat exchanger that provides thermal contact between PCM 130 and the refrigerant fluid, e.g., from the expansion valve 114. For example, one side of the TES 128 contains the PCM 130 and the other side may accommodate the refrigerant stream. A TES heat exchanger may be configured as shell-tube heat exchanger that has coolant tubes within the shell, and where the PCM 130 is disposed inside the shell with refrigerant passing through the tubes. The TES 128 can be configured as a slab filled with PCM 130 and with extruded mini/macro channel tubes running through the slab. Alternatively, the PCM 130 can be encapsulated and emerged in the liquid refrigerant in the shell or in the liquid separator 124. Other TES architectures would work.

As shown in this example implementation of CCRS 10, two TES 128 (with PCM 130) are disposed between junction 136 and junction 138 (i.e., in a parallel arrangement). In each branch of this parallel arrangement, an optional flow control device, such as solenoid valve 150 having inlet 143 (coupled to junction 138) and outlet 145 (coupled to inlet 139) can be positioned. In this example, the solenoid valves 150 are configured to generate a sub-cooling during discharge. In an alternative, each parallel branch could also be associated with its own optional solenoid control valve 112, its own expansion valve 114, and its own liquid separator 124 to generate a sub-cooling during discharge. In this example configuration of the CCRS 10, there is only one each of TES 128 and solenoid valve 150 (both shown in solid line). Thus, in an example configuration, such components shown in dashed line would be eliminated, as would junctions 136 and 138. In a modified implementation, there can be two TES 128 and two solenoid valves 150 (along with junctions 136 and 138). Of course, alternative implementations of the CCRS 10 may include more than two sets of solenoid valve 150 and TES 128 (as opposed to the two sets shown in FIG. 1) configured in parallel.

In another modified configuration of the CCRS 10, the locations of a single TES 128 (e.g., the TES 128 shown in solid line) and evaporator 116 can be switched within the LPS 14. For example, the TES 128 can be disposed such that the inlet 139 is fluidly coupled to the outlet 133 of the pump 132 and, the outlet 141 is fluidly coupled to the inlet 121 of the evaporator 116. The outlet 123 of the evaporator 116 is coupled to junction 134.

In this example implementation of TMS 100 including VCS 12, the VCS 12 can operate in three operational modes: (1) a TES cooling mode; (2) a heat load cooling mode; and (3) an optional pump-down mode.

Initially, each TMS disclosed herein can operate differently at, and immediately following, system start-up, compared to the manner in which the systems operate after an extended running period. Upon start-up, the compressor 104 and a cooling device (e.g., fan 108) moving a cooling fluid (e.g., ambient air 126) through the condenser 106 are powered. The compressor 104 discharges compressed refrigerant into the condenser 106. The refrigerant is condensed and subcooled in the condenser 106. Liquid refrigerant fluid enters receiver 110 at a pressure and temperature generated by operation of the compressor 104 and condenser 106.

In an example TMS cooling operation, the pump 132 is either in the "ON" or the "OFF" states and the heat load 118 is "OFF." The VCS 12 operates to "charge" the TES 128 and more particularly, the PCM 130 in the TES 128 by directing refrigerant though the TES 128 from the evaporator outlet 123. Cooling energy from the refrigerant fluid 1 is stored in the PCM 130 in latent heat form. The VCS 12 cools and freezes the PCM 130 in the TES 128. The evaporating temperature of refrigerant that has thermal contact with the PCM 130 is lower than the freezing temperature to enable heat transfer from the PCM 130 to the refrigerant fluid. Since there is no active heat load, the VCS 12 operates at its lowest evaporating temperature. The compressor 104 induces vapor from the vapor-side outlet 127 of the liquid separator 124 at a low pressure and compresses it to a high pressure.

The vapor at the high pressure and temperature is cooled in the condenser 106. When the VCS 12 is a transcritical system, the condenser 106 operates as a gas cooler. Transcritical systems do not need a receiver 110, thereby making such a component optional in FIG. 1 when the system is designed for transcritical operation. When the VCS operation is subcritical, the condenser 106 operates as a condenser. When operating as a condenser, the vapor is de-superheated, condensed, and subcooled.

Liquid refrigerant from the condenser 106 enters the receiver 110. In the expansion valve 114, the refrigerant at the high pressure is iso-enthalpically expanded to the low pressure and turns into a two-phase (liquid-vapor) mixture that is fed to the inlet 125 of the liquid separator 124. The liquid portion (from liquid section 144) is circulated by pump 132 into the evaporator 116 and then to the TES 128 (or dual TES 128) to cool and/or freeze the PCM 130. The more the PCM 130 freezes, the less the heat load on the boiling refrigerant in the TES 128. The equilibrium between the compressor 104 and the reduced amount of the formed vapor results in a reduced suction pressure, evaporating pressure, and evaporating temperature.

As it was mentioned above, the pump 132 may be in either the 'ON' or the 'OFF' states. If there is a risk of over-cooling the heat load 118, the pump should stay in the OFF state. If the TES 128 is in the liquid separator 124, the pump should stay in the 'ON' state. In some aspects, operation of the pump 132 can be modulated.

The receiver 110 and in the liquid separator 124 are configured to manage liquid refrigerant charge moving from the receiver 110 to the liquid separator 124. The receiver 110 contains a sufficient amount of refrigerant liquid, and the volume of the liquid separator 124 is configured to accommodate all of the non-evaporated liquid needed to maintain a pumping circuit when used.

In an example heat mode cooling operation, the heat load 118 is ON, meaning that the heat load 118 is operational and is discharging heat to the evaporator 116. The operation of the heat load 118 causes the LPS 14 to engage and to cool the heat load 118 by discharging the stored cooling energy from the PCM 130.

The LPS 14 is configured to evaporate refrigerant at a temperature that is below the heat load temperature low limit in order to satisfy the heat load temperature tolerances and the heat transfer rate generated by temperature differential, and above the PCM freezing temperature to enable operation of the TES 128 as a condenser (i.e., a heat discharging heat exchanger)

In some aspects, it may be important to prevent cavitation in the pump 132. To avoid cavitation, the liquid at the pump inlet is subcooled by maintaining a net positive suction head. Sub-cooling generated in the TES 128 and/or hydrostatic pressure of the liquid column in the liquid separator 124 contribute to developing the net positive suction head.

The heat load cooling mode may start operation either while the compressor 104 is OFF or while the compressor 104 continues to operate. Originally, the TES 128 generates sub-cooling at the TES outlet 141, and the compressor 104 should be shut down. The subcooled liquid generated at the TES outlet 141 enters the inlet 125 of the liquid separator 124, and the LPS 14 operates as a regular closed-circuit pumping system. When the TES 128 generates a vapor quality at the outlet 141, then the vapor at the TES outlet 141 can feed the operating compressor 104, and the compressor 104 can be ON.

In the heat load cooling mode, the VCS 12 and LPS 14 may operate simultaneously. In this case, the compressor 104 continues to operate in the heat load cooling mode, as well. This allows increasing the overall TES 128 cooling capacity and/or extends the cooling period. When the PCM 130 melts and the stored thermal energy depletes, the heat load cooling mode is over.

The heat load cooling mode may not require active control of the thermodynamic state at the evaporator outlet 123; the pump 132 may be configured to generate at the evaporator outlet 123 a vapor quality below the critical vapor quality under all operating conditions. The pumping capacity and the outlet vapor quality are interconnected. If the pumping capacity is too low, the pumping flow rate that results causes higher vapor quality, which may exceed the critical vapor quality. On the other hand, if the pumping capacity is too high, the pumping flow rate reduces the outlet vapor quality, but requires higher parasitic pumping power and elevates the risk of cavitation. However, generally the liquid pumping power is very low, thus the parasitic load on the TES 128 is not significant. Therefore, there is a significant amount of pumping flow rate increase that is possible to maintain outlet vapor quality low enough under conditions of the entire operating envelope, while avoiding the higher parasitic pumping power or elevating the risk of cavitation. Alternatively, the pump 132 may be configured to generate a superheat at the evaporator outlet 123.

In an example pump-down operation, liquid refrigerant accumulated in the liquid separator 124 is returned to the receiver 110. In the pump-down mode, the heat load 118 is OFF, the pump 132 is OFF, the optional solenoid control valve 112 and/or the expansion valve 114 are closed and the compressor 104 is ON. The compressor 104 drives vapor from the liquid separator 124 and returns it to the receiver 110 via the condenser 106 (operating as a condenser) by condensing the compressed vapor outputted by the compressor 104. During compressor operation, the pressure in the liquid separator 124 is reduced, the evaporating temperature is reduced, and refrigerant evaporates to generate new portions for the compressor 104 to compress.

Various indicators can be used to show that the receiver 110 is full. Some of these indicators include: the temperature downstream from the condenser 106 and the pressure of the high side indicating a certain amount of sub-cooling, a certain amount of pressure on the high side at a given ambient temperature, a certain amount of liquid level in the receiver 110, a certain amount of liquid level in the liquid separator 124, a certain value of a suction pressure, and/or a certain value of a pumping down period. When the pump-down is completed, the VCS 12 executes the first mode again and gets ready to cool the low heat load 120 again.

In some aspects of TMS 100 (and other example TMS), if the expansion valve 114 has a capability to stop refrigerant flow from the receiver 110, the solenoid control valve 112 may not be needed. Rather, the VCS 12 executes the TES cooling mode, and gets ready to cool the low heat load 120 again. The liquid separator 124 requires a certain level of liquid in the liquid separator 124 for enabling pump operation, while, an excessive amount of liquid at the vapor-side outlet 127 of the liquid separator 124 can damage the compressor 104.

The TES 128 can generate a vapor quality during the discharge or the TES 128 can generate a sub-cooling during the discharge. In the vapor quality case, the VCS 12 and TES 128 may operate simultaneously. The TES 128 and the VCS 12 are configured to fully satisfy the heat load 118 at any given duty cycle. The TMS 100 is configured to cool the TES 128 within the cycle period, when the heat load is OFF. In this arrangement, pump cavitation is a concern.

When the TES 128 generates subcooling, the TES 128 and VCS 12 operate in sequence since there is no vapor for the compressor 104 to compress. The TES 128 is configured to fully satisfy the low heat load 120 at any given duty cycle. As in the vapor quality case, the TMS 100 is configured to cool the TES 128 within the cycle period when the low heat load 120 is OFF. However, in the subcooling case, the TES 128 and VCS 12 are configured to handle larger heat loads than those in the vapor quality case to maintain the same duty cycle. The larger the duty cycle is, the larger the TES 128 and VCS 12 are required. Pump cavitation may not be a concern in the subcooling case.

As shown in FIG. 1, the TMS 100, as all disclosed embodiments, also includes the control system (or controller) 999 (see FIG. 6 for an exemplary embodiment) that produces control signals (based on sensed thermodynamic properties) to control operation of one or more of the various devices, e.g., optional solenoid control valve 112, expansion valve 114, etc., as needed, as well as to control operation of a motor of the compressor 104, fan 108, or other components in other example implementations of a TMS. Control system 999 may receive signals, process received signals and send signals (as appropriate) from/to the sensors and control devices to operate the TMS 100.

The term "control system," as used herein, can refer to an overall system that provides control signals and receives feedback data from unit controllers, such as unit controllers (e.g., programmable logic controllers, motor controllers, variable frequency drives, actuators). In some aspects, the control system includes the overall system and the unit controllers. In some aspects, a control system simply refers to as a single unit controller or a network of two or more individual unit controllers that communicate directly with each other (rather than with an overall system.

The process streams (e.g., refrigerant flows, ambient airflows, other heat exchange fluid flows) in a TMS according to the present disclosure, as well as process streams within any downstream processes with which the TMS is fluidly coupled, can be flowed using one or more flow control systems (e.g., that include the control system 999) implemented throughout the system. A flow control system can include one or more flow pumps, fans, blowers, or solids conveyors to move the process streams, one or more flow pipes through which the process streams are flowed and one or more valves to regulate the flow of streams through the pipes, whether shown in the exemplary figures or not. Each of the configurations described herein can include at least one variable frequency drive (VFD) coupled to a respective pump or fan that is capable of controlling at least one fluid flow rate. In some implementations, liquid flow rates are controlled by at least one flow control valve.

In some embodiments, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system, the flow control system can flow the streams under constant flow conditions, for example, constant volumetric rate or other flow conditions. To change the flow conditions, the operator can manually operate the flow control system, for example, by changing the pump flow rate or the valve open or close position.

In some embodiments, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such embodiments, the operator can manually change the flow conditions by providing inputs through the control system. Also, in such embodiments, the control system can automatically (that is, without manual intervention) control one or more of the flow control systems, for example, using feedback systems connected to the control system. For example, a sensor (such as a pressure sensor, temperature sensor or other sensor) can be connected to a pipe through which a fluid flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Returning to FIG. 1, during operation of TMS 100, cooling can be initiated by a variety of different mechanisms. In some embodiments, for example, LPS 14 can include a temperature sensor attached to the heat load 118. When the temperature of heat load 118 (or multiple heat loads as shown in FIGS. 4A-4D) exceeds a certain temperature set point (i.e., threshold value), control system 999 connected to the temperature sensor can initiate cooling of heat load 118 by the LPS 14. Another mechanism is to operate an optional OCRS 16 in a case of emergency when the PCM 130 is melted as another cooling mechanism.

Upon initiation of a cooling operation, the compressor 104 is OFF and the TES 128 (or multiple TES 128) are ready to provide cooling. The LPS 14 is engaged and liquid refrigerant is circulated by pump 132 into the evaporator 116, where it is evaporated and a high vapor quality (e.g., about 0.8) refrigerant vapor emerges from outlet 123. Then the two-phase refrigerant enters the TES 128 and is condensed to generate a subcooling at the TES outlet 141. Liquid leaving the TES outlet 141 fills the liquid separator 124, and the pump 132 reproduces the cycle. When the TES cooling charge depletes (e.g., PCM 130 is melted) and the TES 128 generates a vapor quality at its outlet 141, the compressor 104 can be engaged to evacuate an excessive amount of refrigerant vapor (e.g., in vapor section 142) to prevent a pressure rise.

In some aspects, to ensure that LPS 14 operates efficiently and the mass flow rate of the refrigerant fluid is relatively low, and at the same time the temperature of heat load 118 is maintained within a relatively small tolerance, LPS 14 adjusts the vapor quality of the refrigerant fluid emerging from evaporator 116 to a value such that an effective vapor quality within evaporator 116 matches, or nearly matches, the critical vapor quality while also avoiding the dryout region of operation.

In LPS 14, expansion valve 114 is generally configured to control the vapor quality of the refrigerant fluid emerging from evaporator 116. As an example, when expansion valve 114 is implemented as an expansion valve, the expansion valve regulates the mass flow rate of the refrigerant fluid through the valve. In turn, for a given set of operating conditions (e.g., ambient temperature, initial pressure in the receiver 110, temperature set point value for heat load 118), the vapor quality determines mass flow rate of the refrigerant fluid emerging from evaporator 116.

Figure 2:
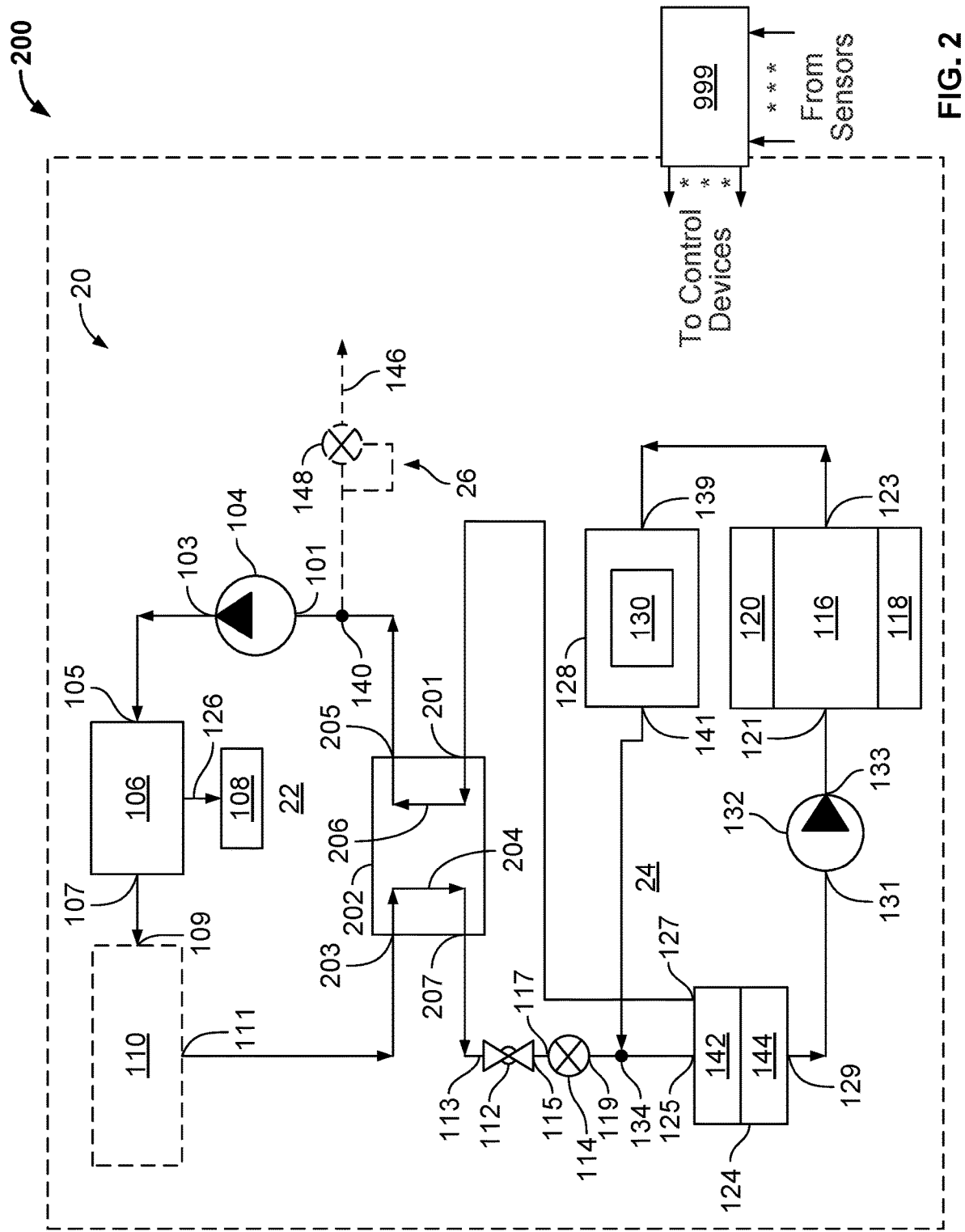

Referring to FIG. 2, an example of a thermal management system (TMS) 200 is shown to include a vapor cycle system (VCS) 22 and an LPS 24 that are arranged in a closed-circuit refrigeration system (CCRS) 20 (which can include an optional OCRS 16 as well). Components shown in the TMS 200 that are also included in TMS 100 generally have the same structure and function as described with reference to FIG. 1. In some aspects, although not shown, the oil circuit from FIG. 1 can be implemented in FIG. 2 as well.

In this example of TMS 200, the VCS 22 includes a recuperative heat exchanger 202. Further, in some aspects, the TMS 200 can be configured as a transcritical system in which receiver 110 is not needed (as shown in dashed line) and the condenser 106 acts as a gas cooler 106. In a transcritical implementation, the outlet 107 of the condenser 106 (as a gas cooler) can be fluidly coupled to a first inlet 203 of the recuperative heat exchanger 202 (with, e.g., a throttling valve and flash separator disposed therebetween, with flash gas provided to one or more transcritical compressors if used).

The recuperative heat exchanger 202 has a first fluid path 204 coupled between the outlet 111 of the receiver 110 (or the outlet 107 of the gas cooler 106) through first inlet 203, and the inlet 125 of the liquid separator 124 (through the optional solenoid valve 112 and expansion valve 114, if used) through first outlet 204. The recuperative heat exchanger 202 includes a second fluid path 206 coupled between the vapor-side outlet 127 of liquid separator 124 (through a second inlet 201) and the junction 140 (through a second outlet 205). The recuperative heat exchanger 202 transfers heat energy from the refrigerant fluid emerging from liquid separator 124 to refrigerant fluid upstream from expansion valve 114. Inclusion of the recuperative heat exchanger 202 can reduce mass flow rate demand and allows operation of evaporator 116 within threshold of vapor quality.

The recuperative heat exchanger 202 provides thermal contact between the liquid refrigerant leaving the receiver 110 (in a subcritical operation), or between a mixed phase refrigerant exiting the gas cooler 106 (in a transcritical operation), and the refrigerant vapor from the liquid separator 124. The use of the recuperative heat exchanger 202, at the outlet of the receiver 110 may further reduce liquid refrigerant mass flow rate demand from the receiver 110 by re-using the enthalpy of the exhaust vapor to precool the PCM 130 in TES 128 that reduces the enthalpy of the refrigerant entering the TES 128, and thus reduces mass flow rate demand and provides a relative increase in energy efficiency of TMS 200. A suitable refrigerant fluid for a transcritical VCS 12 can be carbon dioxide.

In a transcritical TES cooling mode, the pump 132 may stay ON or OFF. The compressor 104 compresses vapor at the vapor-side outlet 127 of the liquid separator 124 and discharges the compressed vapor into the gas cooler 106. The compressed vapor is cooled in the gas cooler 34 and is further cooled by the recuperative heat exchanger 202 by the refrigerant stream exiting the liquid separator 124. The compressed vapor is enthalpically expanded by the expansion valve 114. After the expansion, the high-pressure vapor turns into two phase mixture and the mixture enters the TES 128. The liquid portion of the mixture freezes the PCM 130 and the refrigerant evaporates. When the PCM 130 is frozen, the load on the evaporating refrigerant is reduced and the non-evaporated refrigerant is collected in the liquid separator 124. The liquid separator 124 is configured to accommodate all non-evaporated refrigerant.

In a transcritical heat load cooling mode, the LPS 24 is engaged to cool heat loads 118 and 120 (e.g., a low heat load 120 and a high heat load 118) by discharging the stored cooling energy from the PCM 130. The refrigerant collected in the liquid separator 124 evaporates in the evaporator 116 and is returned to the VCS 12. No pump-down may be required in this configuration.

Figure 3:
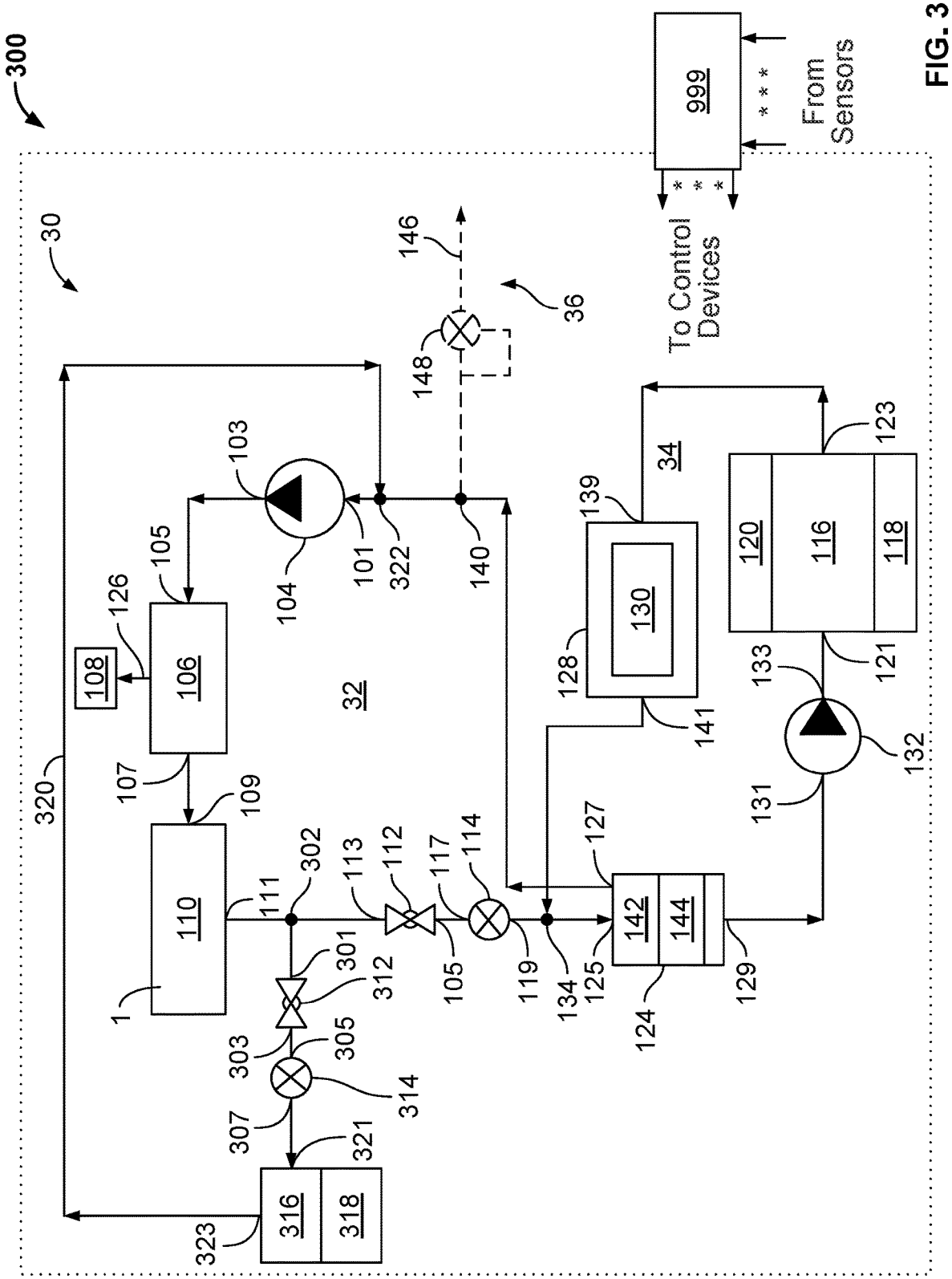

Referring to FIG. 3, an example of a thermal management system (TMS) 300 is shown to include a vapor cycle system (VCS) 22 arranged in or with a closed-circuit refrigeration system (CCRS) 30, as well as an LPS 34 (as well as an optional OCRS 16). Components shown in the TMS 300 that are also included in TMS 100 or TMS 200 generally have the same structure and function as described with reference to FIGS. 1 and 2. In some aspects, although not shown, the oil circuit from FIG. 1 can be implemented in FIG. 3 as well.

As illustrated, TMS 300 can also include a secondary cooling loop 36 that includes junction 302 fluidly coupled between outlet 111 and inlet 113, an optional solenoid valve 312 having an inlet 301 (coupled to junction 302) and an outlet 303, an optional expansion valve 314 having an inlet 305 and outlet 307, and an evaporator 316 with an inlet 321 and an outlet 323, each of which is disposed in conduit 320 that connects to a junction 322 between junction 302 and inlet 101 of compressor 104. In this example, a heat load 318 (e.g., a high temperature heat load) is in thermal conductive or convective contact or in proximity with the evaporator 316.

As further shown in FIG. 3, sensors 324 and 326 can be positioned in the TMS 300. Sensor 324 is positioned between outlet 119 and junction 134. Sensor 326 is positioned in exhaust 146.

As shown, the evaporator 316 receives refrigerant fluid 1, via the expansion valve 314 and optional solenoid valve 312, from the receiver outlet 111. Refrigerant fluid 1 is used to cool the high temperature heat load 318, e.g., without vapor quality control, to provide complete vapor at the outlet 323 of the evaporator 316, that is then fed to junction 322 (to either be exhausted in OCRS 16 (as described with reference to FIG. 3) or compressed by compressor 104).

By a high temperature, heat load 318 is meant that cooling is accomplished at a high temperature relative to the cooling temperature of a low heat load 120 and/or a high heat load 118. The receiver 110 and expansion valve 314 are configured to cool the high temperature heat load 318 at a temperature that is lower than the temperature used to cool heat loads 120, 118. That is, the low temperature heat load 120 is cooled by refrigerant fluid that is below the condensation temperature of the refrigerant vapor, whereas high temperature heat load 418 is cooled at a high temperature that is equal to or above the condensation temperature of the refrigerant vapor. Examples of high temperature heat loads 318 are batteries and various electronic and mechanical devices.

In this example implementation, expansion valve 114 is communicably coupled to sensor 324 and back-pressure regulator 148 is communicably coupled to sensor 326. The sensors 324, 326 provide information about the thermodynamic quantities upon which adjustments of these valves are based. The sensors 324, 326 can be implemented in many different ways, depending upon the nature of the valves. Such sensors, as well as other sensors, can be disposed in the TMS 100 and/or 200.

In operation, TMS 300 can operate in a TES cooling mode, a heat load cooling mode, and a pump-down mode (if necessary). Such modes are similar to those described with reference to TMS 200. During a heat load cooling mode, solenoid valve 312 can be opened to allow refrigerant fluid from receiver 110 to also circulate to cool high temperature heat load 318 in evaporator 316 before either being exhausted through exhaust 146 or compressed by compressor 104.

Referring now to FIGS. 4A-4D additional evaporator configurations that are alternative configurations of the evaporator 116 and heat loads 120, 118 are shown. In the configuration of FIG. 4A, both the low heat load 120 and the high heat load 118 are in thermal conductive and/or convective contact or are in proximity to a single, i.e., the same evaporator 116. In the configuration of FIG. 4B, each of a pair of series coupled evaporators 116 have the low heat load 120 and the high heat load 118 in thermal conductive and/or convective contact or are in proximity. In an alternative configuration of FIG. 4A, (not shown), the low heat load 120 would be coupled (or proximate) to a first one of the pair of evaporators 116 and the high heat load 118 would be coupled (or proximate) to a second one of the pair of evaporators 116. In the configurations of FIGS. 4C and 4D, the low heat load 120 and the high heat load 118 are thermally coupled to (or are in proximity to) corresponding ones of the pair of evaporators 116. In the configurations of FIGS. 4C and 4D, a first T-valve 402 (e.g., junction device either passive or active), as shown, combines refrigerant flow from the evaporators 116 into a single flow. One of these evaporators 116 is thermally coupled (or proximate to) the low heat load 120 and the other of these evaporators 116 is thermally coupled (or proximate to) the high heat load 118. Other configurations are possible. In the configuration of FIG. 4C, the outlets of the evaporators 116 are coupled via conduit to inlets of a second T-valve 402 (active or passive) that has an outlet that sends refrigerant to liquid-side inlet 125 of the liquid separator 124. On the other hand, in the configuration of FIG. 4D, the inlets of the evaporators 116 are coupled differently, through expansion devices 114.

Figure 5:
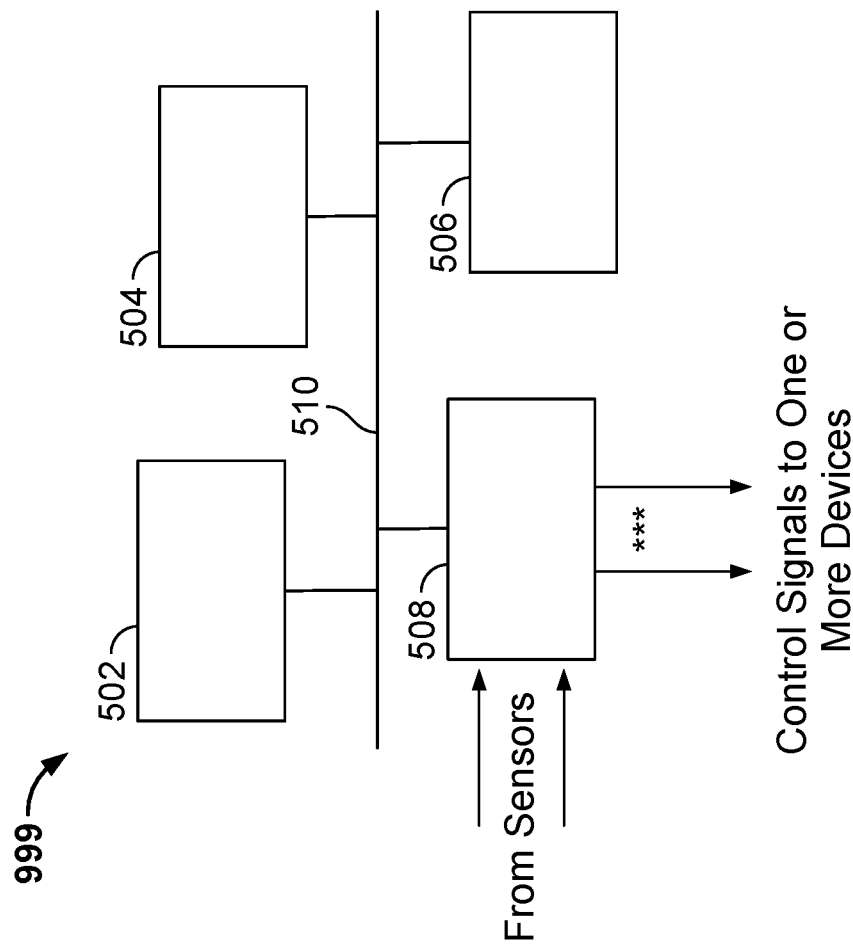
FIG. 5 is a block diagram of a control system or controller for a TMS according to the present disclosure.

Referring now to FIG. 5, control system 999 can generally be implemented as any one of a variety of different electrical or electronic computing or processing devices, and can perform any combination of the various steps discussed above to control various components of the disclosed thermal management systems.

Control system 999 generally includes a processor 502 (or multiple processors), a memory 504, a storage device 506, and input/output interfaces 508. Some or all of these components can be interconnected using a system bus 510. The processor 502 is capable of processing instructions for execution. In some embodiments, the processor 502 is a single-threaded processor. In certain embodiments, the processor 502 is a multi-threaded processor. Typically, the processor 502 is capable of processing instructions stored in the memory 504 or on the storage device 506 to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory 504 stores information within the control system 999, and can be a computer-readable medium, such as a volatile or non-volatile memory. The storage device can be capable of providing mass storage for the control system 999. In general, the storage device 506 can include any non-transitory tangible media configured to store computer readable instructions. For example, the storage device can include a computer-readable medium and associated components, including: magnetic disks, such as internal hard disks and removable disks; magneto-optical disks; and optical disks. Storage devices suitable for tangibly embodying computer program instructions and data include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output interfaces 508 provide input/output operations for control system 999. In some embodiments, the input/output interfaces include a display unit for displaying graphical user interfaces and system related information.

The features described herein, including components for performing various measurement, monitoring, control, and communication functions, can be implemented in digital electronic circuitry, or in computer hardware, firmware, or in combinations of them. Methods steps can be implemented in a computer program product tangibly embodied in an information carrier, e.g., in a machine-readable storage device, for execution by a programmable processor (e.g., of control system 999), and features can be performed by a programmable processor executing such a program of instructions to perform any of the steps and functions described above. Computer programs suitable for execution by one or more system processors include a set of instructions that can be used directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

In addition to one or more processors and/or computing components implemented as part of control system 999, the systems disclosed herein can include additional processors and/or computing components within any of the control device (e.g., expansion valve 114) and any of the sensors discussed above. Processors and/or computing components of the control devices and sensors, and software programs and instructions that are executed by such processors and/or computing components, can generally have any of the features discussed above in connection with control system 999

A variety of different refrigerant fluids can be used in a TMS as described herein. For open-circuit refrigeration systems, in general, emissions regulations and operating environments may limit the types of refrigerant fluids that can be used. For example, in certain embodiments, the refrigerant fluid can be ammonia having very large latent heat; after passing through the cooling circuit, the ammonia refrigerant can be disposed of by incineration, by chemical treatment (i.e., neutralization), and/or by direct venting to the atmosphere. In certain embodiments, the refrigerant fluid can be an ammonia-based mixture that includes ammonia and one or more other substances. For example, mixtures can include one or more additives that facilitate ammonia absorption or ammonia burning. In some aspects, such as for transcritical design of any of the example TMS, carbon dioxide can be used as the refrigerant fluid.

More generally, any fluid can be used as a refrigerant in the open circuit refrigeration systems disclosed herein, provided that the fluid is suitable for cooling the low heat load 120 (e.g., the fluid boils at an appropriate temperature) and in embodiments where the refrigerant fluid is exhausted directly to the environment, regulations and other safety and operating considerations do not inhibit such discharge.

A TMS can include a number of different sensors. Each of the sensors is optional, and various combinations of the sensors can be used to measure thermodynamic properties and produce signals that are used to adjust flow control devices, back-pressure regulator 148, motor of the compressor 104, etc.

Optional pressure sensors can be coupled upstream and downstream from TES 128, respectively, and are configured to measure information about the pressure differential $p_r-p_e$ across TES 128, and transmit an electronic signal corresponding to the measured pressure difference information. While separate sensors are described, in certain embodiments the sensors can be replaced by a single pressure differential sensor. Where a pressure differential sensor is used, a first end of the sensor is connected upstream of TES 128 and a second end of the sensor is connected downstream from TES 128.

Optional pressure sensors can be coupled upstream and downstream from expansion valve 114, respectively, and are configured to measure information about the pressure differential $p_r-p_e$ across expansion valve 114, and transmit an electronic signal corresponding to the measured pressure difference information. While separate sensors are described, in certain embodiments the sensors can be replaced by a single pressure differential sensor. Where a pressure differential sensor is used, a first end of the sensor is connected upstream of expansion valve 114 and a second end of the sensor is connected downstream from expansion valve 114.

A TMS can also include optional pressure sensors positioned at the inlet and outlet, respectively, of evaporator 116. Sensor at the inlet measures and transmits information about the refrigerant fluid pressure upstream from evaporator 116, and sensor at the outlet measures and transmits information about the refrigerant fluid pressure downstream from evaporator 116. This information can be used (e.g., by the control system 999) to calculate the refrigerant fluid pressure drop across evaporator 116. As above, in certain embodiments, the sensors can be replaced by a single pressure differential sensor, a first end of which is connected adjacent to the evaporator inlet and a second end of which is connected adjacent to the evaporator outlet. The pressure differential sensor measures and transmits information about the refrigerant fluid pressure drop across evaporator 116.

To measure the evaporating pressure ($p_e$), a sensor can be optionally positioned between the inlet and outlet of evaporator 116, i.e., internal to evaporator 116. In such a configuration, the sensor can provide a direct measurement of the evaporating pressure. To measure refrigerant fluid pressure at other locations within an OCRS, the sensor can also optionally be positioned at various locations within the system. For example, the sensor can be located in-line along conduit. Alternatively, the sensor can be positioned at or near an inlet of expansion valve 314. Pressure sensors at each of these locations can be used to provide information about the refrigerant fluid pressure downstream from evaporator 116, or the pressure drop across evaporator 116.

A TMS can include an optional temperature sensor which can be positioned adjacent to an inlet or an outlet of TES 128, or between the inlet and the outlet. Sensor measures temperature information for the refrigerant fluid within TES 128 and transmits an electronic signal corresponding to the measured information.

A TMS can include an optional temperature sensor which can be positioned adjacent to an inlet or an outlet of evaporator 116, or between the inlet and the outlet. The temperature sensor measures temperature information for the refrigerant fluid within evaporator 116 (which represents the evaporating temperature) and transmits an electronic signal corresponding to the measured information. A TMS can also include an optional temperature sensor attached to low heat load 120 and/or high heat load 118, which measures temperature information for the load and transmits an electronic signal corresponding to the measured information.

A TMS can include an optional temperature sensor adjacent to the outlet of evaporator 116 that measures and transmits information about the temperature of the refrigerant fluid as it emerges from evaporator 116.

In certain embodiments, the systems disclosed herein are configured to determine superheat information for the refrigerant fluid based on temperature and pressure information for the refrigerant fluid measured by any of the sensors disclosed herein. The superheat of the refrigerant vapor refers to the difference between the temperature of the refrigerant fluid vapor at a measurement point in the a TMS and the saturated vapor temperature of the refrigerant fluid defined by the refrigerant pressure at the measurement point in the system.

To determine the superheat associated with the refrigerant fluid, the control system 999 receives information about the refrigerant fluid vapor pressure after emerging from a heat exchanger downstream from evaporator 116, and uses calibration information, a lookup table, a mathematical relationship, or other information to determine the saturated vapor temperature for the refrigerant fluid from the pressure information. The control system 999 also receives information about the actual temperature of the refrigerant fluid, and then calculates the superheat associated with the refrigerant fluid as the difference between the actual temperature of the refrigerant fluid and the saturated vapor temperature for the refrigerant fluid.

The foregoing temperature sensors can be implemented in a variety of ways in a TMS. As one example, thermocouples and thermistors can function as temperature sensors in a TMS. Examples of suitable commercially available temperature sensors for use in a TMS include, but are not limited to, the 88000 series thermocouple surface probes (available from OMEGA Engineering Inc., Norwalk, Conn.).

A TMS can include a vapor quality sensor that measures vapor quality of the refrigerant fluid emerging from evaporator 116. Typically, such a sensor is implemented as a capacitive sensor that measures a difference in capacitance between the liquid and vapor phases of the refrigerant fluid. The capacitance information can be used to directly determine the vapor quality of the refrigerant fluid (e.g., by the control system 999). Alternatively, such a sensor can determine the vapor quality directly based on the differential capacitance measurements and transmit an electronic signal that includes information about the refrigerant fluid vapor quality. Examples of commercially available vapor quality sensors that can be used in a TMS include, but are not limited to, HBX sensors (available from HB Products, Hasselager, Denmark).

It should be appreciated that in the foregoing discussion, any one or various combinations of two or more sensors discussed in connection with an OCRS can correspond to the first measurement device connected to expansion valve 114, and any one or various combinations of two or more sensors can correspond to the second measurement device connected to expansion valve 314 or back-pressure regulator 148. In general, as discussed previously, a first measurement device provides information corresponding to a first thermodynamic quantity to the expansion valve 114, and a second measurement device provides information corresponding to a second thermodynamic quantity to the expansion valve 314, where the first and second thermodynamic quantities are different, and therefore allow the first and second control device (expansion valve 114 and expansion valve 314) to independently control two different system properties (e.g., the vapor quality of the refrigerant fluid and the heat load temperature, respectively).

It should also be understood that a third control device in an OCRS can be adjusted based on a measurement of vapor pressure within receiver 110 and/or by mechanical force applied to a diaphragm within the third control device. For example, in some embodiments, expansion valve 114 is adjusted (e.g., automatically or by control system 999) based on a measurement of the evaporation pressure ($p_e$) of the refrigerant fluid and/or a measurement of the evaporation temperature of the refrigerant fluid.

In certain embodiments, expansion valve 114 is adjusted (e.g., automatically or by control system 999) based on a measurement of the temperature of low heat load 120 or high heat load 118. With expansion valve 114 adjusted in this manner, back-pressure regulator can be adjusted (e.g., automatically or by control system 999) based on measurements of one or more of the following system parameter values: the pressure drop across expansion valve 114, the pressure drop across evaporator 116, the refrigerant fluid pressure in receiver 110, the vapor quality of the refrigerant fluid emerging from evaporator 116 (or at another location in the system), the superheat value of the refrigerant fluid, and the evaporation pressure ($p_e$) and/or evaporation temperature of the refrigerant fluid.

In some embodiments, control system 999 adjusts back-pressure regulator 148 during OCRS operation as an emergency means to control evaporation pressure $p_e$ of the refrigerant fluid downstream from expansion valve 114 (e.g., measured by a sensor) and/or a measurement of the evaporation temperature of the refrigerant fluid (e.g., measured by a sensor). With expansion valve 114 adjusted based on this measurement, control system 999 can adjust expansion valve 114 based on measurements of one or more of the following system parameter values: the pressure drop ($p_r-p_e$) across expansion valve 114, the pressure drop across evaporator 116, the refrigerant fluid pressure in receiver 116 ($p_r$), the vapor quality of the refrigerant fluid emerging from evaporator 116 (or at another location in the system), the superheat value of the refrigerant fluid in the system, and the temperature of low heat load 120 or high heat load 118.

In certain embodiments, control system 999 adjusts back-pressure regulator 148 based on a measurement of the temperature of low heat load 120 or high heat load 118 (e.g., measured by a sensor). Control system 999 can also adjust expansion valve 114 based on measurements of one or more of the following system parameter values: the pressure drop ($p_r-p_e$) across expansion valve 114, the pressure drop across evaporator 116, the refrigerant fluid pressure in receiver 110 ($p_r$), the vapor quality of the refrigerant fluid emerging from evaporator 116 (or at another location in the system), the superheat value of the refrigerant fluid in the system, the evaporation pressure ($p_e$) of the refrigerant fluid, and the evaporation temperature of the refrigerant fluid.

To adjust expansion valve 114 based on a particular value of a measured system parameter value, control system 999 compares the measured value to a set point value (or threshold value) for the system parameter. Certain set point values represent a maximum allowable value of a system parameter, and if the measured value is equal to the set point value (or differs from the set point value by 10% or less (e.g., 5% or less, 3% or less, 1% or less) of the set point value), control system 999 adjusts expansion valve 114 to adjust the operating state of the system, and reduce the system parameter value.

Certain set point values represent a minimum allowable value of a system parameter, and if the measured value is equal to the set point value (or differs from the set point value by 10% or less (e.g., 5% or less, 3% or less, 1% or less) of the set point value), control system 999 adjusts expansion valve 114 to adjust the operating state of the system, and increase the system parameter value.

Some set point values represent "target" values of system parameters. For such system parameters, if the measured parameter value differs from the set point value by 1% or more (e.g., 3% or more, 5% or more, 10% or more, 20% or more), control system 999 adjusts expansion valve 114 to adjust the operating state of the system, so that the system parameter value more closely matches the set point value.

In the foregoing examples, measured parameter values are assessed in relative terms based on set point values (i.e., as a percentage of set point values). Alternatively, in some embodiments, measured parameter values can be assessed in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then control system 999 adjusts expansion valve 114 to adjust the operating state of the system, so that the measured system parameter value more closely matches the set point value.

The foregoing examples of thermal management systems illustrate a number of features that can be included in any of the systems within the scope of this disclosure. In addition, a variety of other features can be present in such systems.

In certain embodiments, refrigerant fluid that is discharged from evaporator 116 and passes through conduit can be directly discharged as exhaust from conduit without further treatment. Direct discharge provides a convenient and straightforward method for handling spent refrigerant and has the added advantage that, over time, the overall weight of the system is reduced due to the loss of refrigerant fluid. For systems that are mounted to small vehicles or are otherwise mobile, this reduction in weight can be important.

In some embodiments, however, refrigerant fluid vapor can be further processed before it is discharged. Further processing may be desirable depending upon the nature of the refrigerant fluid that is used, as direct discharge of unprocessed refrigerant fluid vapor may be hazardous to humans and/or may be deleterious to mechanical and/or electronic devices in the vicinity of a TMS. For example, the unprocessed refrigerant fluid vapor may be flammable or toxic, or may corrode metallic device components. In situations such as these, additional processing of the refrigerant fluid vapor may be desirable.

In general, refrigerant processing apparatus can be implemented in various ways. In some embodiments, refrigerant processing apparatus is a chemical scrubber or water-based scrubber. Within apparatus, the refrigerant fluid is exposed to one or more chemical agents that treat the refrigerant fluid vapor to reduce its deleterious properties. For example, where the refrigerant fluid vapor is basic (e.g., ammonia) or acidic, the refrigerant fluid vapor can be exposed to one or more chemical agents that neutralize the vapor and yield a less basic or acidic product that can be collected for disposal or discharged from apparatus.

As another example where the refrigerant fluid vapor is highly chemically reactive, the refrigerant fluid vapor can be exposed to one or more chemical agents that oxidize, reduce, or otherwise react with the refrigerant fluid vapor to yield a less reactive product that can be collected for disposal or discharged from apparatus.

In certain embodiments, refrigerant processing apparatus can be implemented as an adsorptive sink for the refrigerant fluid. Apparatus can include, for example, an adsorbent material bed that binds particles of the refrigerant fluid vapor, trapping the refrigerant fluid within apparatus and preventing discharge. The adsorptive process can sequester the refrigerant fluid particles within the adsorbent material bed, which can then be removed from apparatus and sent for disposal.

In some embodiments, where the refrigerant fluid is flammable, refrigerant processing apparatus can be implemented as an incinerator. Incoming refrigerant fluid vapor can be mixed with oxygen or another oxidizing agent and ignited to combust the refrigerant fluid. The combustion products can be discharged from the incinerator or collected (e.g., via an adsorbent material bed) for later disposal.

As an alternative, refrigerant processing apparatus can also be implemented as a combustor of an engine or another mechanical power-generating device. Refrigerant fluid vapor from conduit can be mixed with oxygen, for example, and combusted in a piston-based engine or turbine to perform mechanical work, such as providing drive power for a vehicle or driving a generator to produce electricity. In certain embodiments, the generated electricity can be used to provide electrical operating power for one or more devices, including high heat load 118. For example, high heat load 118 can include one or more electronic devices that are powered, at least in part, by electrical energy generated from combustion of refrigerant fluid vapor in refrigerant processing apparatus.

The thermal management systems disclosed herein can optionally include a phase separator upstream from the refrigerant processing apparatus.

Particularly during start-up of the systems disclosed herein, liquid refrigerant may be present in conduits because the systems generally begin operation before a high temperature heat load and/or low or high heat loads are activated. Accordingly, phase separator functions in a manner similar to phase separators to separate liquid refrigerant fluid from refrigerant vapor. The separated liquid refrigerant fluid can be re-directed to another portion of the system, or retained within phase separator until it is converted to refrigerant vapor. By using phase separator, liquid refrigerant fluid can be prevented from entering refrigerant processing apparatus.

In some embodiments, the refrigeration systems disclosed herein can be combined with power systems to form integrated power and thermal systems, in which certain components of the integrated systems are responsible for providing refrigeration functions and certain components of the integrated systems are responsible for generating operating power.

Figure 6:
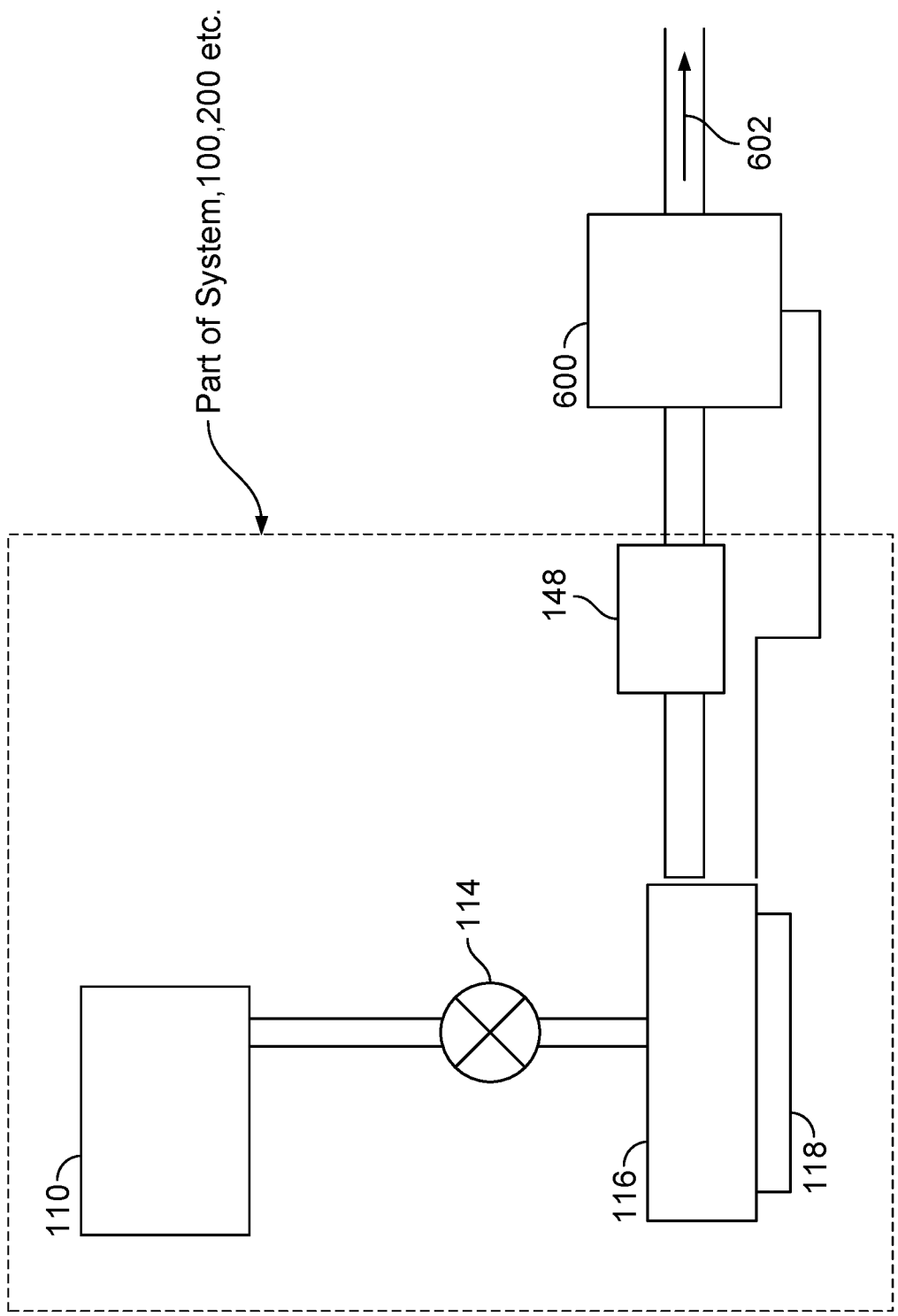
FIG. 6 is a schematic diagram of an example of a TMS that includes or is coupled to a power generation apparatus according to the present disclosure.

FIG. 6 shows an integrated power and TMS that includes many features similar to those discussed above (e.g., see FIGS. 1-3) with only aspects of the open-circuit portions shown. In example implementations, a TMS or portion of a TMS is coupled to or is part of an engine 600 with an inlet that receives the stream of waste refrigerant fluid. Engine 600 can combust the waste refrigerant fluid directly, or alternatively, can mix the waste refrigerant fluid with one or more additives (such as oxidizers) before combustion. Where ammonia is used as the refrigerant fluid in a TMS, suitable engine configurations for both direct ammonia combustion as fuel, and combustion of ammonia mixed with other additives, can be implemented. In general, combustion of ammonia improves the efficiency of power generation by the engine.

The energy released from combustion of the refrigerant fluid can be used by engine 600 to generate electrical power, e.g., by using the energy to drive a generator. The electrical power can be delivered via electrical connection to high heat load 118 to provide operating power for the high heat load 118. For example, in certain embodiments, high heat load 118 includes one or more electrical circuits and/or electronic devices, and engine 600 provides operating power to the circuits/devices via combustion of refrigerant fluid. Byproducts 602 of the combustion process can be discharged from engine 600 via exhaust conduit, as shown in FIG. 6.

Various types of engines and power-generating devices can be implemented as engine 600 with a TMS. In some embodiments, for example, engine 600 is a conventional four-cycle piston-based engine, and the waste refrigerant fluid is introduced into a combustor of the engine. In certain embodiments, engine 600 is a gas turbine engine, and the waste refrigerant fluid is introduced via the engine inlet to the afterburner of the gas turbine engine. As discussed above, in some embodiments, a TMS can include a phase separator (not shown) positioned upstream from engine 600. Phase separator functions to prevent liquid refrigerant fluid from entering engine 600, which may reduce the efficiency of electrical power generation by engine 600.

In some aspects, the thermal management systems and methods disclosed herein can be implemented as part of (or in conjunction with) directed energy systems such as high energy laser systems. Due to their nature, directed energy systems typically present a number of cooling challenges, including certain heat loads for which temperatures are maintained during operation within a relatively narrow range.

Figure 7:
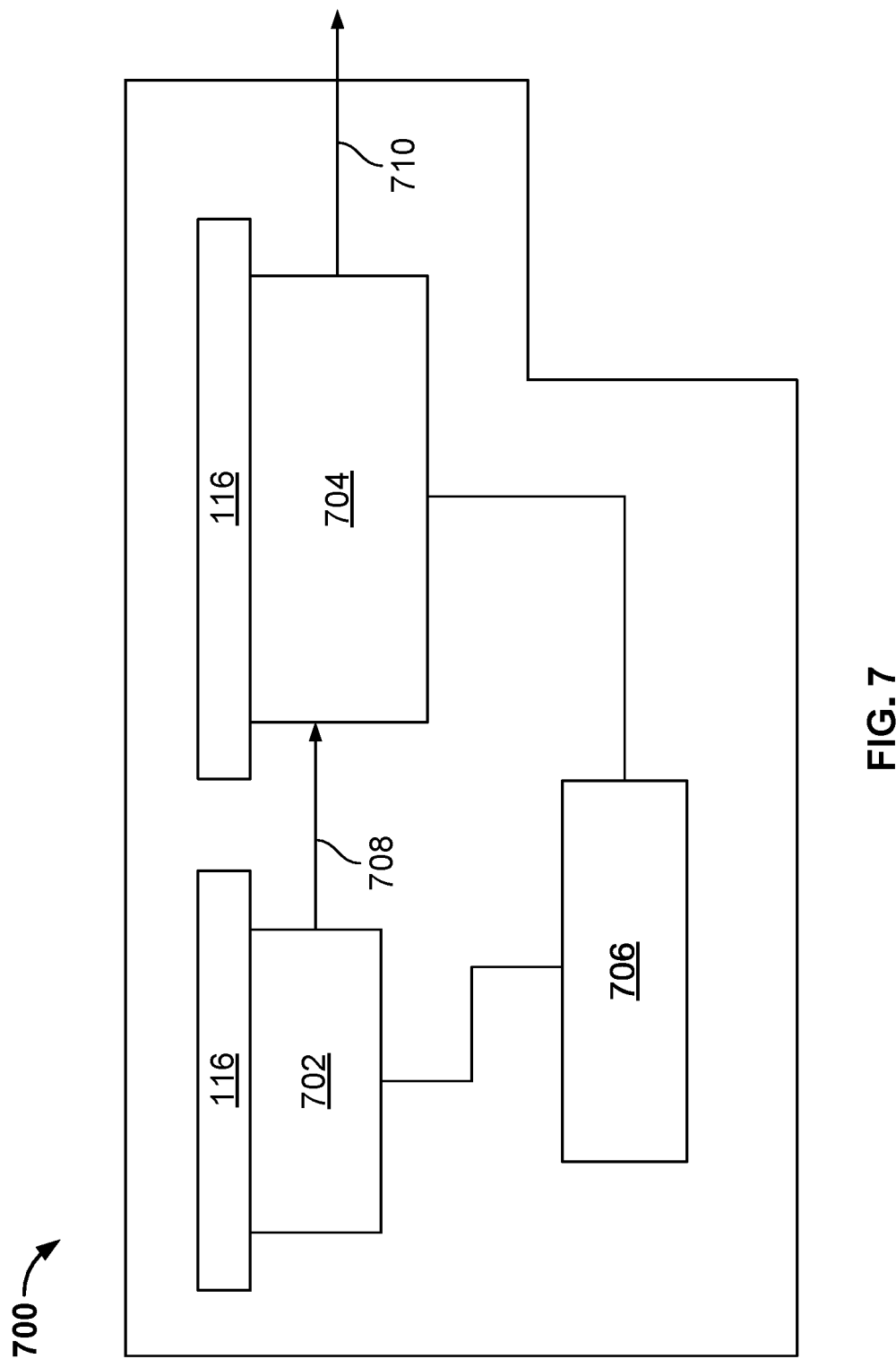
FIG. 7 is a schematic diagram of an example of directed energy system that includes a TMS according to the present disclosure.

FIG. 7 shows one example of a directed energy system, specifically, a high energy laser system 700. System 700 includes a bank of one or more laser diodes 702 and an amplifier 704 both connected to a power source 706. During operation, laser diodes 702 generate an output radiation beam 708 that is amplified by amplifier 704 and directed as an output beam 710 onto a target. Generation of high energy output beams can result in the production of significant quantities of heat. Certain laser diodes, however, are relatively temperature sensitive, and the operating temperature of such diodes is regulated within a relatively narrow range of temperatures to ensure efficient operation and avoid thermal damage. Amplifiers are also temperature-sensitively, although typically less sensitive than diodes.

To regulate the temperatures of various components of directed energy systems such as diodes 702 and amplifier 704, such systems can include components and features of the thermal management systems disclosed herein. In FIG. 7, evaporator 116 is coupled to diodes 702 and/or amplifier 704. The other components of the thermal management systems disclosed herein are not shown for clarity. However, it should be understood that any of the features and components discussed above can optionally be included in directed energy systems. Diodes 702, due to their temperature-sensitive nature, effectively function as high heat load 118 in system 700, while amplifier 704 functions as low heat load 120.

System 700 is one example of a directed energy system that can include various features and components of the thermal management systems and methods described herein. However, it should be appreciated that the thermal management systems and methods are general in nature, and can be applied to cool a variety of different heat loads under a wide range of operating conditions.

A number of embodiments have been described. Nevertheless, it will be understood that various modifications may be made without departing from the spirit and scope of the disclosure. Accordingly, other embodiments are within the scope of the following claims.

What is claimed is:
1. A thermal management system, comprising:
a closed-circuit refrigeration system, comprising:
a vapor cycle system (VCS), comprising:
a receiver that stores a refrigerant fluid; and a liquid separator comprising a liquid-separator inlet, a liquid-side outlet, and a vapor side outlet, the vapor cycle system configured to operate in one or more operational modes comprising at least one of a TES cooling mode, a heat load cooling mode, or a pump-down mode; and
a liquid pumping system (LPS), comprising:
a thermal energy storage (TES) that stores a phase change material (PCM), the TES comprising a TES inlet and a TES outlet fluidly coupled to the liquid separator inlet;
a pump comprising a pump inlet and a pump outlet; and
at least one evaporator comprising an evaporator inlet coupled to the TES outlet with the TES inlet coupled to the pump outlet, the at least one evaporator configured to extract heat from a heat load that is in thermal conductive or convective contact or in proximity to the at least one evaporator to transfer heat from the heat load to the refrigerant fluid and provide the refrigerant fluid from an evaporator outlet that is coupled to the liquid-separator inlet to the TES inlet, the LPS configured to operate in the heat load cooling mode.

2. The system of claim 1, wherein the VCS further comprises an expansion valve, a compressor, and a heat rejection heat exchanger.

3. The system of claim 2, wherein the expansion valve is configured to control a vapor quality of the refrigerant fluid at the evaporator outlet.

4. The system of claim 1, wherein the TES comprises a heat exchanger that provides thermal contact between the PCM and the refrigerant fluid.

5. The system of claim 4, wherein in the TES cooling mode, the VCS is configured to charge the PCM in the TES by directing the refrigerant fluid from the receiver through the liquid separator and through the pump and the at least one evaporator to the TES to cause cooling energy from the refrigerant fluid to be stored in the PCM in latent heat form.

6. The system of claim 2, wherein the VCS operates according to a transcritical refrigeration cycle or a subcritical refrigeration cycle.

7. The system of claim 6, wherein the VCS is configured to operate in the transcritical refrigeration cycle, and the heat rejection heat exchanger operates as a gas cooler, and the compressor induces refrigerant vapor from the vapor side outlet of the liquid separator at a low pressure and compresses the refrigerant vapor at the low pressure into a refrigerant vapor at a high pressure, with the refrigerant vapor at the high pressure and temperature being cooled in the gas cooler.

8. The system of claim 6, wherein the VCS is configured to operate in the subcritical refrigeration cycle, and the heat rejection heat exchanger operates as a condenser, with the refrigerant vapor in the condenser being de-superheated, condensed, and subcooled.

9. The system of claim 2, wherein in the heat load cooling mode, the VCS is configured to cool the heat load.

10. The system of claim 9, wherein liquid refrigerant from the receiver is iso-enthalpically expanded in the expansion valve to a low-pressure two-phase mixture of a refrigerant liquid phase and a refrigerant vapor phase.

11. The system of claim 10, wherein a portion of the refrigerant liquid phase boils out to cool or freeze the PCM in the TES, with any non-evaporated refrigerant liquid being captured by the liquid separator.

12. The system of claim 9, wherein the LPS is configured to cool the heat load by discharging the stored cooling energy from the PCM in the heat load cooling mode based on operation of the heat load.

13. The system of claim 1, wherein the LPS is configured to evaporate the refrigerant fluid at a temperature in a range that is below the heat load temperature low limit in order to satisfy heat load temperature tolerances and at the heat transfer rate generated by a temperature differential, and above a PCM freezing temperature to enable operation of the TES as a condenser.

14. The system of claim 2, wherein the heat load cooling mode starts either while the compressor is in an off state or while the compressor is in an on state.

15. The system of claim 14, wherein when the compressor is in the off state, the VCS is configured to operate to increase a refrigerant pressure of the refrigerant fluid to turn the refrigerant fluid that is in a saturated refrigerant liquid thermodynamic state in the liquid separator into a subcooled state.

16. The system of claim 15, wherein the pump is configured to circulate the subcooled refrigerant liquid from the liquid-side outlet through the at least one evaporator to cause complete or partial evaporation of the refrigerant liquid, with refrigerant vapor formed in the at least one evaporator being transported to the TES for cooling.

17. The system of claim 15, wherein when the PCM has melted and the stored thermal energy is depleted, the heat load cooling mode has completed a cycle of operation.

18. The system of claim 14, wherein when the compressor is in the on state, the compressor operation increases system cooling capacity or extends the cooling period.

19. The system of claim 18, wherein when the refrigerant fluid is pumped into the at least one evaporator, the heat load generates refrigerant vapor and an evaporating pressure in the evaporator rises, increasing the pressure in the liquid separator, and a refrigerant liquid thermodynamic state becomes subcooled, and with the engaged pump pumping the subcooled refrigerant liquid from a liquid-side outlet of the liquid separator through the at least one evaporator causing complete or partial evaporation of the subcooled refrigerant liquid, with the refrigerant vapor that results from operation of the heat load in contact with or proximate to the at least one evaporator is condensed and subcooled in the TES.

20. The system of claim 19, wherein the VCS is configured to return the subcooled refrigerant liquid from the receiver to the liquid-separator inlet.

21. The system of claim 20, further comprising a back-pressure regulator and wherein in the pump-down mode the heat load is off and the pump is off, the back-pressure regulating valve is closed and the compressor is on.

22. The system of claim 21, wherein in the pump-down mode, the compressor is configured to receive refrigerant vapor from the liquid separator, compress the refrigerant vapor, and cause the compressed refrigerant vapor to be condensed in the heat rejection heat exchanger, and with the heat rejection exchanger returning the condensed refrigerant vapor to the receiver.

23. The system of claim 22, wherein during compressor operation, the pressure in the liquid separator is reduced, the evaporating temperature is reduced, and refrigerant fluid evaporates to generate refrigerant vapor for the compressor to compress.

24. The system of claim 2, further comprising:
an open-circuit refrigerant system comprising the receiver, the expansion valve, the TES, the at least one evaporator, the liquid separator, and the open-circuit refrigerant system further comprising:
an exhaust; and
a back-pressure regulating valve configured to control a temperature of the heat load.

25. The system of claim 24, wherein the expansion valve is configured to control a vapor quality of the refrigerant fluid at the at least one evaporator, while avoiding a dryout region of a phase state of the refrigerant fluid.

26. The system of claim 1, further comprising a recuperative heat exchanger comprising a pair of refrigerant fluid paths, with a first refrigerant fluid path coupled downstream of the receiver and a second refrigerant fluid path coupled upstream of the liquid separator.

27. The system of claim 26, wherein the recuperative heat exchanger is configured to provide thermal contact between a liquid refrigerant leaving the receiver and a refrigerant vapor from the liquid separator.

28. The system of claim 24, further comprising a recuperative heat exchanger comprising a pair of refrigerant fluid paths, with a first refrigerant fluid path coupled downstream of the receiver and a second refrigerant fluid path coupled upstream of the liquid separator.

29. The system of claim 28, wherein the recuperative heat exchanger is configured to provide thermal contact between a liquid refrigerant leaving the receiver and a refrigerant vapor from the liquid separator.

30. The system of claim 1, wherein the at least one evaporator is a first evaporator and the heat load is a first heat load, and the LPS system further comprises a second evaporator.

31. The system of claim 30, wherein the second evaporator comprises an inlet fluidly coupled to the receiver outlet and an outlet fluidly coupled to the compressor inlet.

32. The system of claim 30, wherein the second evaporator is configured to cool a second heat load; and the closed-circuit refrigeration system further comprises an expansion valve fluidly coupled to the receiver outlet and the inlet to the second evaporator.

33. A thermal management method, comprising:
transporting a refrigerant fluid along a closed-circuit refrigerant fluid flow path that extends from a receiver to a vapor cycle system (VCS) and to a thermal energy system (TES) that stores a phase change material (PCM) and to a liquid separator, with a liquid-side of the liquid separator fluidly coupled to a pump inlet of a pump of a liquid pumping system (LPS) and a pump outlet of the pump fluidly coupled to an evaporator, and with a vapor-side of the liquid separator fluidly coupled to a compressor and a heat rejection heat exchanger fluidly coupled to the compressor, with the compressor comprising an outlet coupled to a receiver inlet;
operating the closed-circuit refrigerant fluid flow path according to an operational mode that comprises at least one of a TES cooling mode, a heat load cooling mode, or a pump-down mode;
transporting the refrigerant fluid from the receiver to an expansion valve;
controlling a vapor quality of the refrigerant fluid at an outlet of the evaporator with the expansion valve; and
discharging a portion of the refrigerant fluid through an open-circuit refrigerant system that comprises the receiver, the expansion valve, the TES, the evaporator, the liquid separator, the open-circuit refrigeration system further comprising an exhaust line and a back-pressure regulating valve configured to control a temperature of the heat load.

34. The method of claim 33, further comprising providing heat exchange between the PCM and the refrigerant fluid in the TES.

35. The method of claim 33, further comprising operating the closed-circuit refrigeration system in the TES cooling mode, with the operation further comprising:
charging the PCM in the TES by directing the refrigerant fluid through the TES from the receiver; and
causing cooling energy from the refrigerant fluid to be stored in the PCM in latent heat form.

36. The method of claim 35, further comprising operating the VCS in a transcritical refrigeration cycle or a subcritical refrigeration cycle.

37. The method of claim 36, wherein operating the VCS in the transcritical refrigeration cycle comprises:
causing the heat rejection heat exchanger to operate as a gas cooler;
compressing, by the compressor, a refrigerant vapor from a vapor side outlet of the liquid separator that is induced at a low pressure to compress the refrigerant vapor at the low pressure into a refrigerant vapor at a high pressure and high temperature; and
cooling the refrigerant vapor at the high pressure and high temperature in the gas cooler.

38. The method of claim 36, wherein operating the VCS in the subcritical refrigeration cycle comprises:
causing the heat rejection heat exchanger to operate as a condenser; and
condensing a refrigerant vapor in the condenser by de-superheating, condensing, and sub-cooling.

39. The method of claim 33, further comprising cooling the heat load in the TES heat load cooling mode.

40. The method of claim 39, further comprising iso-enthalpically expanding liquid refrigerant from the receiver in the expansion valve to a low-pressure two-phase mixture of a refrigerant liquid phase and a refrigerant vapor phase.

41. The method of claim 40, further comprising:
boiling a portion of the refrigerant liquid phase out from the PCM in the TES; and
capturing non-evaporated refrigerant liquid by the liquid separator.

42. The method of claim 39, further comprising operating the LPS to cool the heat load by discharging the stored cooling energy from the PCM.

43. The method of claim 33, further comprising evaporating refrigerant fluid, with operation of the LPS, at a temperature in a range that is below the heat load temperature low limit in order to satisfy heat load temperature tolerances and at the heat transfer rate generated by a temperature differential, and above a phase change material freezing temperature, to enable operation of the TES as a condenser.

44. The method of claim 33, further comprising initiating operation of the heat load cooling mode either while the compressor is in an off state or while the compressor is in an on state.

45. The method of claim 44, wherein when the compressor is in the off state, the method further comprises:
converting refrigerant pressure of the refrigerant fluid in the VCS that is in a saturated refrigerant liquid thermodynamic state in the liquid separator into a subcooled state; and
pumping the subcooled refrigerant liquid through the evaporator to cause complete or partial evaporation of the refrigerant liquid, with refrigerant vapor formed in the evaporator being captured by and condensed and subcooled in the TES.

46. The method of claim 45, further comprising returning the subcooled refrigerant liquid to the liquid separator.

47. The method of claim 45, wherein when the PCM has melted and the stored thermal energy is depleted, the heat load cooling mode has completed a cycle of operation.

48. The method of claim 44, further comprising increasing the overall system cooling capacity or extends the cooling period when the compressor is in the on state.

49. The method of claim 48, wherein when refrigerant is pumped into the evaporator, the heat load generates refrigerant vapor and an evaporating pressure in the evaporator rises, increasing the pressure in the liquid separator, and a refrigerant liquid thermodynamic state becomes subcooled, and with the engaged pump pumping the subcooled refrigerant liquid from a liquid-side outlet of the liquid separator through the evaporator causing complete or partial evaporation of the subcooled refrigerant liquid, with the refrigerant vapor that results from operation of the heat load in contact with or proximate to the evaporator is condensed and subcooled in the TES.

50. The method of claim 33, further comprising directing the refrigerant through a recuperative heat exchanger comprising a pair of refrigerant fluid paths, with a first refrigerant fluid path fluidly coupled downstream of the receiver and a second refrigerant fluid path fluidly coupled upstream of the liquid separator.

51. The method of claim 33, wherein the evaporator is a first evaporator and the heat load is a first heat load, and the method further comprises directing a portion of the refrigerant from the receiver to a second evaporator.

52. The method of claim 51, further comprising cooling a second heat load in the second evaporator.

53. A thermal management system, comprising:
a closed-circuit refrigeration system, comprising:
    a vapor cycle system (VCS), comprising:
        a receiver that stores a refrigerant fluid; and a liquid separator comprising a liquid-separator inlet, a liquid-side outlet, and a vapor side outlet, the vapor cycle system configured to operate in one or more operational modes comprising at least one of a TES cooling mode, a heat load cooling mode, or a pump-down mode; and
    a liquid pumping system (LPS), comprising:
        a thermal energy storage (TES) that stores a phase change material (PCM), the TES comprising a TES inlet and a TES outlet fluidly coupled to the liquid separator inlet, wherein the TES comprises a heat exchanger that provides thermal contact between the PCM and the refrigerant fluid;
        a pump comprising a pump inlet and a pump outlet; and
        at least one evaporator comprising an evaporator inlet coupled to the pump outlet, the at least one evaporator configured to extract heat from a heat load that is in thermal conductive or convective contact or in proximity to the at least one evaporator to transfer heat from the heat load to the refrigerant fluid and provide the refrigerant fluid from an evaporator outlet to the TES inlet, the LPS configured to operate in the heat load cooling mode, wherein
in the TES cooling mode, the VCS is configured to charge the PCM in the TES by directing the refrigerant fluid from the receiver through the liquid separator and through the pump and the at least one evaporator to the TES to cause cooling energy from the refrigerant fluid to be stored in the PCM in latent heat form.

54. A thermal management system, comprising:
a closed-circuit refrigeration system, comprising:
    a vapor cycle system (VCS), comprising:
        a receiver that stores a refrigerant fluid; and a liquid separator comprising a liquid-separator inlet, a liquid-side outlet, and a vapor side outlet, the vapor cycle system configured to operate in one or more operational modes comprising at least one of a TES cooling mode, a heat load cooling mode, or a pump-down mode;
    a liquid pumping system (LPS), comprising:
        a thermal energy storage (TES) that stores a phase change material (PCM), the TES comprising a TES inlet and a TES outlet fluidly coupled to the liquid separator inlet;
        a pump comprising a pump inlet and a pump outlet; and
        at least one evaporator comprising an evaporator inlet coupled to the pump outlet, the at least one evaporator configured to extract heat from a heat load that is in thermal conductive or convective contact or in proximity to the at least one evaporator to transfer heat from the heat load to the refrigerant fluid and provide the refrigerant fluid from an evaporator outlet to the TES inlet, the LPS configured to operate in the heat load cooling mode; and
a recuperative heat exchanger comprising a pair of refrigerant fluid paths, with a first refrigerant fluid path coupled downstream of the receiver and a second refrigerant fluid path coupled upstream of the liquid separator.

\* \* \* \* \*